US012541172B2

(12) United States Patent
Terui et al.

(10) Patent No.: US 12,541,172 B2
(45) Date of Patent: Feb. 3, 2026

(54) PROCESS CARTRIDGE

(71) Applicant: CANON KABUSHIKI KAISHA, Tokyo (JP)

(72) Inventors: Yuhei Terui, Shizuoka (JP); Takashi Kenmoku, Shizuoka (JP); Shintaro Noji, Shizuoka (JP); Kodai Hayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/883,462

(22) Filed: Sep. 12, 2024

(65) Prior Publication Data

US 2025/0085660 A1 Mar. 13, 2025

(30) Foreign Application Priority Data

Sep. 12, 2023 (JP) ................................ 2023-147438
Aug. 21, 2024 (JP) ................................ 2024-139814

(51) Int. Cl.

| | |
|---|---|
| ***G03G 9/08*** | (2006.01) |
| ***G03G 9/087*** | (2006.01) |
| ***G03G 9/093*** | (2006.01) |
| ***G03G 9/097*** | (2006.01) |
| ***G03G 15/08*** | (2006.01) |
| ***G03G 21/18*** | (2006.01) |

(52) U.S. Cl.

CPC ....... *G03G 21/1814* (2013.01); *G03G 9/0819* (2013.01); *G03G 9/08797* (2013.01); *G03G 9/09342* (2013.01); *G03G 9/09371* (2013.01); *G03G 9/09725* (2013.01); *G03G 15/0812* (2013.01); *G03G 21/1821* (2013.01); *G03G 21/186* (2013.01)

(58) Field of Classification Search

CPC ............ G03G 9/0819; G03G 9/08755; G03G 9/08797; G03G 9/09342; G03G 9/09371; G03G 9/09716; G03G 9/09725; G03G 15/0812; G03G 21/1814; G03G 21/1821; G03G 21/186

See application file for complete search history.

(56) References Cited

U.S. PATENT DOCUMENTS

| | | | | |
|---|---|---|---|---|
| 9,335,667 B1 * | 5/2016 | Zona | .................. | G03G 15/0921 |
| 2009/0142677 A1 * | 6/2009 | Shitara | ............... | G03G 15/2025 430/48 |
| 2025/0116945 A1 * | 4/2025 | Aoki | .................. | G03G 9/08797 |

FOREIGN PATENT DOCUMENTS

| | | |
|---|---|---|
| JP | 2002003213 A | 1/2002 |
| JP | 2011253203 A | 12/2011 |
| JP | 2015041047 A | 3/2015 |
| JP | 2015125258 A | 7/2015 |
| JP | 2020079902 A | 5/2020 |

* cited by examiner

*Primary Examiner* — Sophia S Chen

(74) *Attorney, Agent, or Firm* — Canon U.S.A., Inc. IP Division

(57) ABSTRACT

The process cartridge includes a developing roller, a toner supplying roller, a toner regulating member, and a toner, a movement direction of a surface of the developing roller is opposite to a movement direction of a surface of the toner supplying roller in a position where the surface of the developing roller is in contact with the surface of the toner supplying roller, the developing roller and the toner supplying roller are formed such that a peripheral speed ratio R satisfies a range of 1.1 to 2.5, and the toner satisfying predetermined requirements is used.

11 Claims, 6 Drawing Sheets

PROCESS CARTRIDGE

BACKGROUND

Field

The present disclosure relates to a process cartridge used in a copying machine and a printer that use an electrophotographic method or an electrostatic recording method.

Description of the Related Art

In an image forming apparatus such as a printer that uses an electrophotographic image forming method (electrophotographic process), an electrophotographic photoreceptor (hereinafter, referred to as "photoreceptor") serving as an image carrying member is uniformly charged, and the charge photoreceptor is selectively exposed to light to form an electrostatic image on the photoreceptor. The electrostatic image formed on the photoreceptor is visualized as a toner image with a toner serving as a developer. Further, image recording is performed by transferring the toner image formed on the photoreceptor to a recording material such as recording paper or a plastic sheet and applying heat or a pressure to the toner image transferred onto the recording material so that the toner image is fixed on the recording material.

Such an image forming apparatus typically requires replenishment of a developer and maintenance of various process units. In order to facilitate an operation of replenish an image forming apparatus with a developer and maintenance of various process units, a system of forming a process cartridge that is attachable to and detachable from an image forming apparatus main body, by combining a photoreceptor, a charging unit, a developing unit, a cleaning unit, and the like in a frame to form a cartridge, has come into practical use. According to the process cartridge system, an image forming apparatus with excellent usability can be provided.

In recent years, a color image forming apparatus that forms a color image using developers of a plurality of colors has been widely used. A so-called in-line type image forming apparatus in which photoreceptors corresponding to each of image forming operations using developers of a plurality of colors are arranged in a row in a surface movement direction of a transfer material to which a toner image is transferred is known as the color image forming apparatus. Examples of the in-line type color image forming apparatus include an in-line type color image forming apparatus in which a plurality of photoreceptors are arranged in a row in a direction (for example, a horizontal direction) intersecting a vertical direction (gravitational direction). The in-line type image forming apparatus is a suitable image forming apparatus in terms that image formation is performed at a high speed and requirements such as development of a multifunction filter can be easily dealt with.

Examples of the image forming apparatus include an image forming apparatus in which a photoreceptor is disposed below an intermediate transfer member serving as a transfer material or a recording carrying member that conveys a recording material serving as a transfer material (see Japanese Patent Laid-Open No. 2011-253203). In a case where the photoreceptor is disposed below the intermediate transfer member or the recording material carrying member, for example, a fixing device and a developing device (or exposure device) can be disposed at separate positions in a state of sandwiching the intermediate transfer member and the recording material carrying member in the image forming apparatus main body. Therefore, the developing device (or the exposure device) and the fixing device can be disposed at separate positions, which is advantageous in terms that the developing device (or the exposure device) is difficult to be affected by heat of the fixing device.

In recent years, there has been an increasing demand for improving the productivity, and a printer capable of performing high-speed printing has been required. As a cartridge configuration that enables high-speed printing, a cartridge configuration in which a toner is satisfactorily supplied by disposing a developing roller serving as a recording material carrying member and a toner supplying roller for supplying a developer to the developing roller and causing a difference in peripheral speed between the developing roller and the toner supplying roller has been suggested (see Japanese Patent Laid-Open No. 2015-41047 and Japanese Patent Laid-Open No. 2020-79902).

In a case where printing at a higher speed is expected to be realized with these suggested configurations, there are problems with stability of toner supply and charging stability in a high-temperature and high-humidity environment, an in-plane density difference which is a difference between the density of an upper end and the density of a lower end of a transfer material when a high-speed printing image is developed, a decrease in density, and fogging when white printing (solid white image) is performed.

SUMMARY

The present disclosure provides a process cartridge that stabilizes the amount of a toner to be supplied to a developing toner to suppress occurrence of an in-plane density difference and stabilizes a toner coat on the developing roller so that a satisfactory image quality can be maintained without degradation of the image quality, such as a decrease in image density or fogging.

According to the present disclosure, there is provided a process cartridge that is mountable on an image forming apparatus, the process cartridge including: a developing chamber, in which the developing chamber includes a developing roller that develops an electrostatic latent image formed on a surface of a photosensitive drum using a toner to form a toner image, a toner supplying roller that supplies the toner to the developing roller, a toner regulating member that regulates a layer thickness of the toner on the developing roller, and a toner, a surface of the developing roller is in contact with a surface of the toner supplying roller, a movement direction of the surface of the developing roller is opposite to a movement direction of the surface of the toner supplying roller in a position where the surface of the developing roller is in contact with the surface of the toner supplying roller, the movement direction of the surface of the toner supplying roller includes an upward component at the position where the surface of the developing roller is in contact with the surface of the toner supplying roller in a mounting state where the process cartridge is mounted on an apparatus main body of the image forming apparatus, the developing roller and the toner supplying roller are formed such that a peripheral speed ratio R represented by Equation (E1) satisfies $1.1 \leq R \leq 2.5$, $$R = V_{RS}/V_D \quad \text{(E1)}$$

(in Equation (E1), $V_{RS}$ represents an absolute value [m/sec] of a peripheral speed of the surface of the toner supplying roller, and $V_D$ represents an absolute value [m/sec] of a peripheral speed of the surface of the developing roller), the toner contains a toner particle and a silica fine particle, the toner particle contains a crystalline resin component, a content of the silica fine particle is 1.5 parts by mass or greater and 5.0 parts by mass or less with respect to 100 parts by mass of the toner particle, the toner has an aggregation degree of 70.0% or greater and 99.0% or less, and in a case where an average area ratio of a domain of the crystalline resin component in a surface layer region to a depth of 200 nm from a surface of the toner particle is defined as As when a cross section of the toner particle is observed using a transmission electron microscope. As is 1.0% by area or less.

Further features of the present invention will become apparent from the following description of exemplary embodiments with reference to the attached drawings.

DESCRIPTION OF THE EMBODIMENTS

Figure 1:
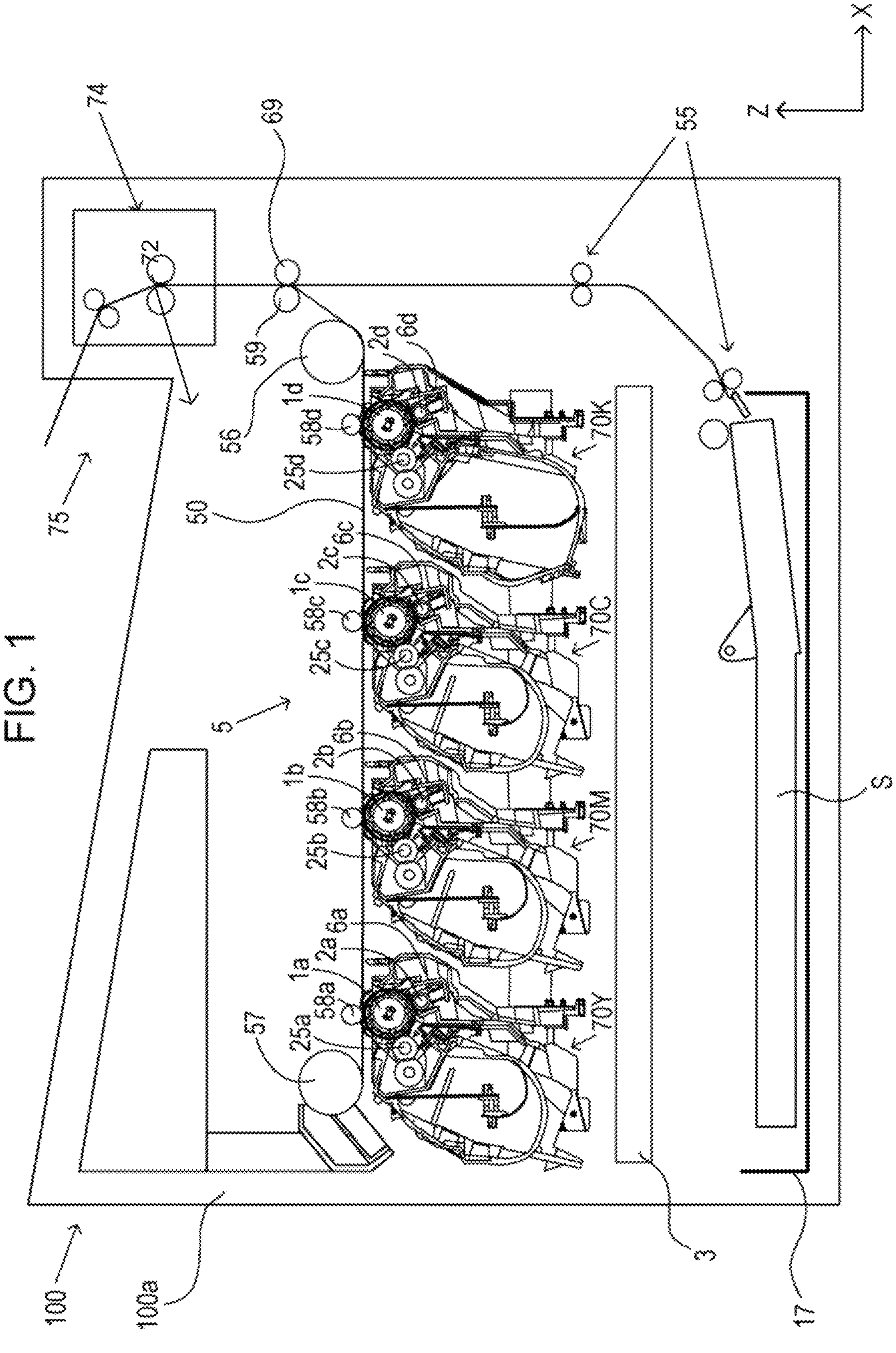
FIG. 1 is a schematic cross-sectional view showing an image forming apparatus to which the present disclosure can be applied.

Hereinafter, a process cartridge according to the present disclosure will be described in more detail with reference to the accompanying drawings. Here, the dimensions, the materials, the shapes, the relative dispositions, and the like of constituent components described in this embodiment are not intended to limit the scope of the present disclosure thereto unless otherwise specified. Further, the materials, the shapes, and the like of members described once in the following description are the same as those in the subsequent description. Well-known techniques or publicly known techniques in the technical field can be applied to the configurations or steps that are not described or shown in the drawings. Further, repeated description may not be provided.

The description of "XX or greater and YY or less" and "XX to YY" showing numerical ranges denotes numerical ranges including the lower limits and the upper limits as end points unless otherwise specified.

In a case where the numerical ranges are described in a stepwise manner, the upper limits and the lower limits of the respective numerical ranges can be optionally combined.

In order to deal with the above-described problems, a method of improving the stability of toner supply and the charging stability in a cartridge configuration has been examined in which a movement direction of a surface of a developing roller is opposite to a movement direction of a surface of a toner supplying roller.

As a result, it has been found that the above-described problems can be solved by appropriately controlling the aggregation degree of a toner, the state of presence of a crystalline resin component, and the amount of silica fine particles serving as an external additive in a certain range of R represented by Equation (E1).

That is, a process cartridge of the present disclosure is a process cartridge that is mountable on an image forming apparatus, including a developing chamber, in which the developing chamber includes a developing roller that develops an electrostatic latent image formed on a surface of a photosensitive drum using a toner to form a toner image, a toner supplying roller that supplies the toner to the developing roller, a toner regulating member that regulates a layer thickness of the toner on the developing roller, and a toner, a surface of the developing roller is in contact with a surface of the toner supplying roller, a movement direction of the surface of the developing roller is opposite to a movement direction of the surface of the toner supplying roller in a position where the surface of the developing roller is in contact with the surface of the toner supplying roller, the movement direction of the surface of the toner supplying roller includes an upward component at the position where the surface of the developing roller is in contact with the surface of the toner supplying roller in a mounting state where the process cartridge is mounted on an apparatus main body of the image forming apparatus, the developing roller and the toner supplying roller are formed such that a peripheral speed ratio R represented by Equation (E1) satisfies $1.1 \leq R \leq 2.5$ $$R = V_{RS}/V_D \tag{E1}$$

(in Equation (E1), $V_{RS}$ represents an absolute value [m/sec] of a peripheral speed of the surface of the toner supplying roller, and $V_D$ represents an absolute value [m/sec] of a peripheral speed of the surface of the developing roller), the toner contains a toner particle and a silica fine particle, the toner particle contains a crystalline resin component, a content of the silica fine particle is 1.5 parts by mass or greater and 5.0 parts by mass or less with respect to 100 parts by mass of the toner particle, the toner has an aggregation degree of 70.0% or greater and 99.0% or less, and in a case where an average area ratio of a domain of the crystalline resin component in a surface layer region to a depth of 200 nm from a surface of the toner particle is defined as As when a cross section of the toner particle is observed using a transmission electron microscope, As is 1.0% by area or less.

Hereinafter, the process cartridge of the present disclosure will be described in detail.

Image Forming Apparatus

FIG. 1 is a view showing a schematic configuration of an image forming apparatus 100 including the process cartridge according to the present disclosure in a stationary state on a horizontal surface as in actual use. The image forming apparatus 100 is an in-line type full color laser printer that employs an intermediate transfer type printer. As shown in FIG. 1, four process cartridges 70 (70Y, 70M, 70C, and 70K) that are attachable to and detachable from the image forming apparatus are mounted on the image forming apparatus by mounting members (not shown). Further, an upstream side of the process cartridge 70 in a mounting direction of the image forming apparatus 100 is defined as a front side, and a downstream side thereof in the mounting direction is defined as a rear side.

An electrophotographic photosensitive drum (hereinafter, referred to as a photosensitive drum) 1 (1*a*, 1*b*, 1*c*, and 1*d*) is disposed in each process cartridge 70. Further, process units such as a charging roller 2 (2*a*, 2*b*, 2*c*, and 2*d*), a developing roller 25 (25*a*, 25*b*, 25*c*, and 25*d*), and a cleaning member 6 (6*a*, 6*b*, 6*c*, and 6*d*) are integrally disposed around the photosensitive drum 1 of each process cartridge 70. The charging roller 2 uniformly charges the surface of the photosensitive drum 1. The developing roller 25 develops a latent image formed on the photosensitive drum 1 with a developer (hereinafter, referred to as a toner) for visualization. Further, the cleaning member 6 transfers the toner image formed on the photosensitive drum 1 to a recording medium and removes the toner remaining on the photosensitive drum 1. In addition, the details of the configurations and the positional relationships of the photosensitive drum 1, the charging roller 2, the developing roller 25, and the cleaning member 6 will be described below with reference to FIGS. 2 and 3.

Further, a scanner unit 3 that selectively exposing the photosensitive drum 1 to light based on image information to form a latent image on the photosensitive drum 1 is provided below the process cartridge 70 in the gravitational direction.

A cassette 17 containing a recording medium S is mounted on a lower portion of an apparatus main body 100*a*.

Further, a recording medium conveying unit is provided such that the recording medium S passes through a secondary transfer roller 69 and a fixing unit 74 and is conveyed to above the apparatus main body 100*a*. Further, an intermediate transfer unit 5 is provided above each process cartridge 70 (70Y, 70M, 70C, and 70K) as an intermediate transfer unit for transferring a toner image formed on each photosensitive drum 1 (1*a*, 1*b*, 1*c*, and 1*d*). The intermediate transfer unit 5 includes a driving roller 56, a driven roller 57, primary transfer rollers 58 (58*a*, 58*b*, 58*c*, and 58*d*) at positions facing the photosensitive drums 1 of each color, and a facing roller 59 facing the secondary transfer roller 69, and a transfer belt 50 is stretched across these rollers. Further, the transfer belt 50 faces all the photosensitive drums 1, circulatingly moves to come into contact with the photosensitive drums 1, and performs primary transfer from the photosensitive drums 1 to the transfer belt 50 by applying a voltage to the primary transfer rollers 58 (58*a*, 58*b*, 58*c*, and 58*d*). Further, the toner of the transfer belt 50 is transferred to the recording medium S by applying a voltage to the facing roller 59 and the secondary transfer roller 69 disposed inside the transfer belt 50.

In image formation, each photosensitive drum 1 is allowed to rotate, and the photosensitive drum uniformly charged by the charging roller 2 is selectively exposed to light from the scanner unit 3. In this manner, an electrostatic latent image is formed on the photosensitive drum 1. This latent image is developed by the developing roller 25. In this manner, a toner image of each color is formed on each photosensitive drum 1. In synchronization with the image formation, registration roller pairs 55 convey the recording medium S to a secondary transfer position where the facing roller 59 and the secondary transfer roller 69 are in contact with each other in a state of sandwiching the transfer belt 50 therebetween. Further, the toner image of each color on the transfer belt 50 is secondarily transferred to the recording medium S by applying a transfer bias voltage to the secondary transfer roller 69. In this manner, a color image is formed on the recording medium S. The recording medium S on which the color image has been formed is heated and pressurized by the fixing unit 74 to fix the toner image. Thereafter, the recording medium S is discharged to a discharge unit 75 by a discharge roller 72. In addition, the fixing unit 74 is disposed in an upper portion of the apparatus main body 100*a*.

Process Cartridge

Figure 2:
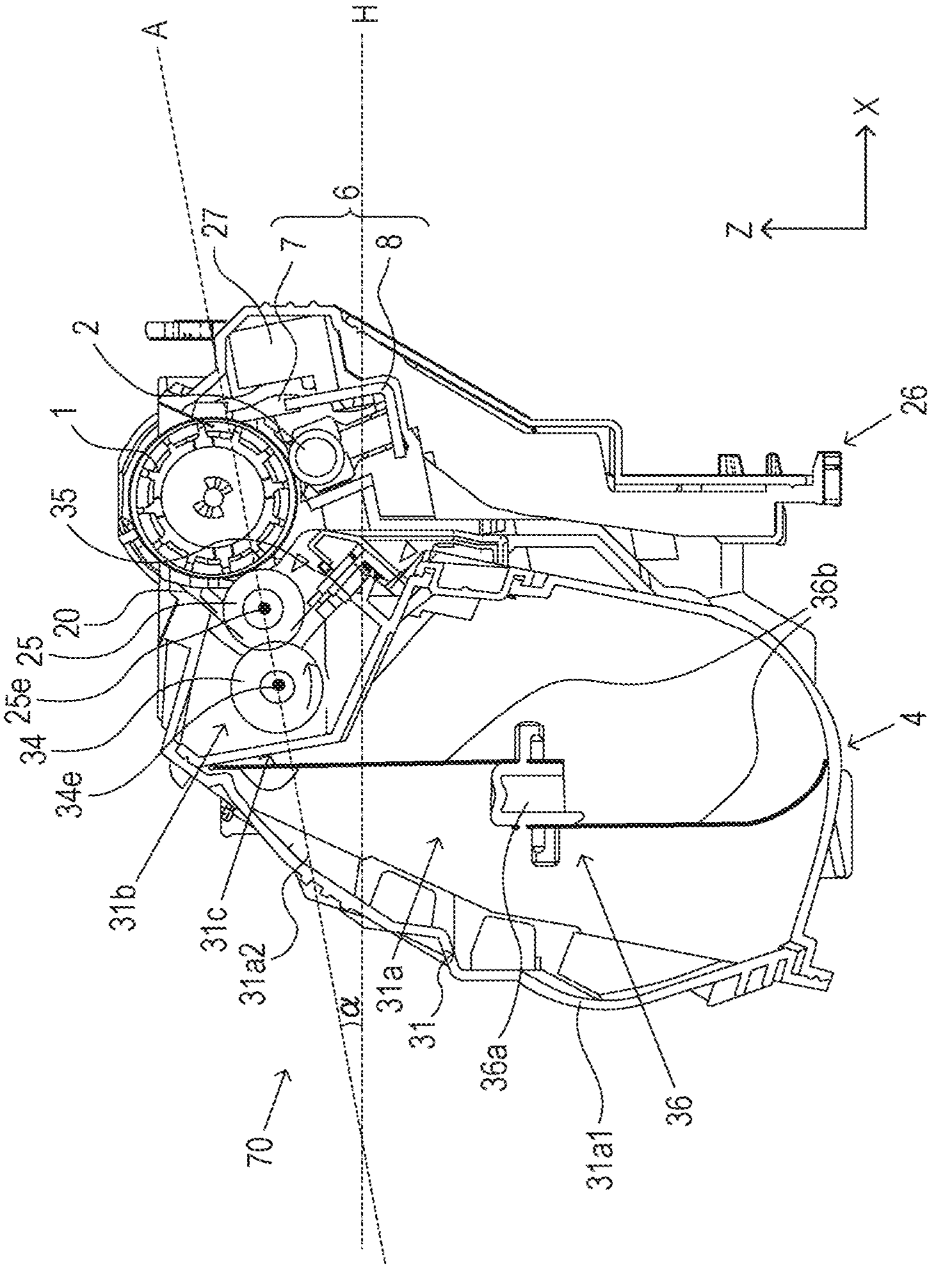
FIG. 2 is a schematic cross-sectional view showing a process cartridge according to examples to which the present disclosure can be applied.

Next, the process cartridge 70 to which the present disclosure has been applied will be described with reference to FIG. 2. FIG. 2 shows a main cross section of the process cartridge 70 accommodating the toner in a state of being mounted on the image forming apparatus 100 of FIG. 1. Further, the cartridge 70Y containing a toner of a yellow color, the cartridge 70M containing a toner of a magenta color, the cartridge 70C containing a toner of a cyan color, and the cartridge 70K containing a toner of a black color have the same configuration.

The process cartridge 70 includes a cleaning unit 26 and a developing unit 4. The cleaning unit 26 includes the photosensitive drum 1, the charging roller 2, and the cleaning member 6. Further, the developing unit 4 includes the developing roller 25.

The charging roller 2 and the cleaning member 6 are disposed on the periphery of the photosensitive drum 1 as described above. The cleaning member 6 includes an elastic member 7 formed of a rubber blade and a cleaning support member 8. A tip portion of the elastic member 7 formed of a rubber blade is disposed in contact with the photosensitive drum in a counter direction with respect to a rotation direction of the photosensitive drum 1. Further, the residual toner removed from the surface of the photosensitive drum 1 by the cleaning member 6 falls into a removed toner chamber 27.

The photosensitive drum 1 is rotationally driven in response to an image forming operation by transmitting a driving force of a main body driving motor (not shown) serving as a driving source to the cleaning unit 26. Here, when a drum coupling fixed to a longitudinal end portion of the photosensitive drum 1 is engaged with a main body side coupling present on a longitudinal axial line of the photosensitive drum 1, the driving force is input to the photosensitive drum 1. The charging roller 2 is rotatably attached to the cleaning unit 26 via a charging roller bearing, is pressurized against the photosensitive drum 1 by a charging roller pressing member, and rotates in conjunction with the photosensitive drum 1.

The developing unit 4 is formed of the developing roller 25 that rotates in contact with the photosensitive drum 1 and a developing frame 31 that supports the developing roller 25. The developing frame 31 is formed of a developing chamber 31*b* and a toner accommodating chamber 31*a* (toner accommodating unit), and the toner accommodating unit is disposed below the developing chamber in the vertical direction.

A toner supplying roller 34 that rotates in a direction indicated by an arrow C in contact with the developing roller 25 and a regulating member (developing blade 35) for regulating a toner layer on the developing roller 25 are disposed on the periphery of the developing roller 25. In examples described below, the outer diameter of the developing roller 25 is 12 mm, and the outer diameter of the toner supplying roller 34 is 13.2 mm. In a state where the process cartridge 70 is mounted on the image forming apparatus 100, an angle α between a horizontal line H and a straight line A connecting a rotation center 25*e* of the developing roller 25 and a rotation center 34*e* of the toner supplying roller 34 is 9.85 degrees. However, the angle α is not limited thereto, and is, for example, in a range of 9.5° to 10.3°.

The developing roller 25 and the toner supplying roller 34 are rotationally driven in response to the image forming operation by transmitting a driving force of a main body driving motor (now shown) different from the driving source of the cleaning unit to the developing unit 4. The driving force is input by a driving input method carried out via a coupling similar to the case of the cleaning unit 26. The driving input method using a coupling is suitable from the viewpoint of rotational stability as compared with a driving input method carried out via a gear.

The developing roller 25 is an elastic body roller formed such that a conductive elastic rubber layer having predetermined volume resistivity is provided as an elastic layer in the periphery of a metallic core metal. The developing roller 25 is formed of a base layer and a surface layer. The base layer is formed of silicone rubber, the surface layer is formed of urethane rubber, and urethane bead particles are dispersed in the urethane rubber of the surface layer so that desired roughness is set. The developing roller 25 and the photosensitive drum 1 respectively rotate such that the surfaces thereof move in the same direction (direction from bottom to top in the present embodiment) in a facing portion (contact portion). In the example described below, the toner negatively charged by triboelectric charging with respect to a predetermined DC bias applied to the developing roller 25 is transferred only to a bright area potential portion due to a potential difference thereof to visualize the electrostatic latent image in the developing unit coming into contact with the photosensitive drum 1.

The developing blade 35 (regulating member) is disposed below the developing roller 25, is in counter contact with the developing roller 25, and regulates the coating amount of the toner supplied by the toner supplying roller 34 and applies an electric charge. In the present embodiment, the developing blade 35 is formed of a plate-like member having flexibility and a support for the developing blade 35, which fixes the plate-like member. The plate-like member is a member with a thickness of 80 m, which is obtained by processing stainless steel (SUS) in a plate spring shape, and a contact portion positioned at a free end of the plate-like member is in contact with the developing roller 25 with a required contact pressure.

The toner supplied onto the developing roller 25 is triboelectrically charged due to the friction between the developing blade 35 and the developing roller 25, and the layer thickness thereof is regulated at the same time as application of an electric charge. Further, in the present embodiment, a predetermined voltage is applied to the developing blade 35 from a blade bias power supply (not shown) to stabilize the toner coat.

The toner to which an electric charge has been applied adheres the surface of the developing roller 25 due to an image force with the developing roller 25. In a case where the adhesion force of the toner to the surface of the developing roller 25 exceeds the regulation force of the developing blade 35, the toner coat on the developing roller 25 is disturbed (so-called "regulation defects"). When regulation defects occur, image defects such as fogging in which the toner adheres to a white background of the image and an abnormal density occur.

Figure 4:
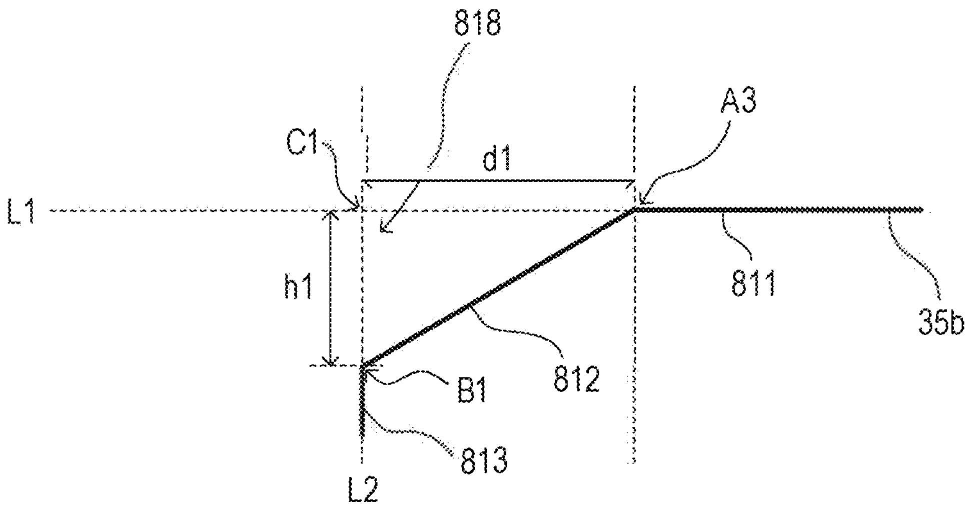
FIG. 4 is a conceptual cross-sectional view showing a transverse direction of a developing blade according to examples to which the present disclosure can be applied.
Figure 7:
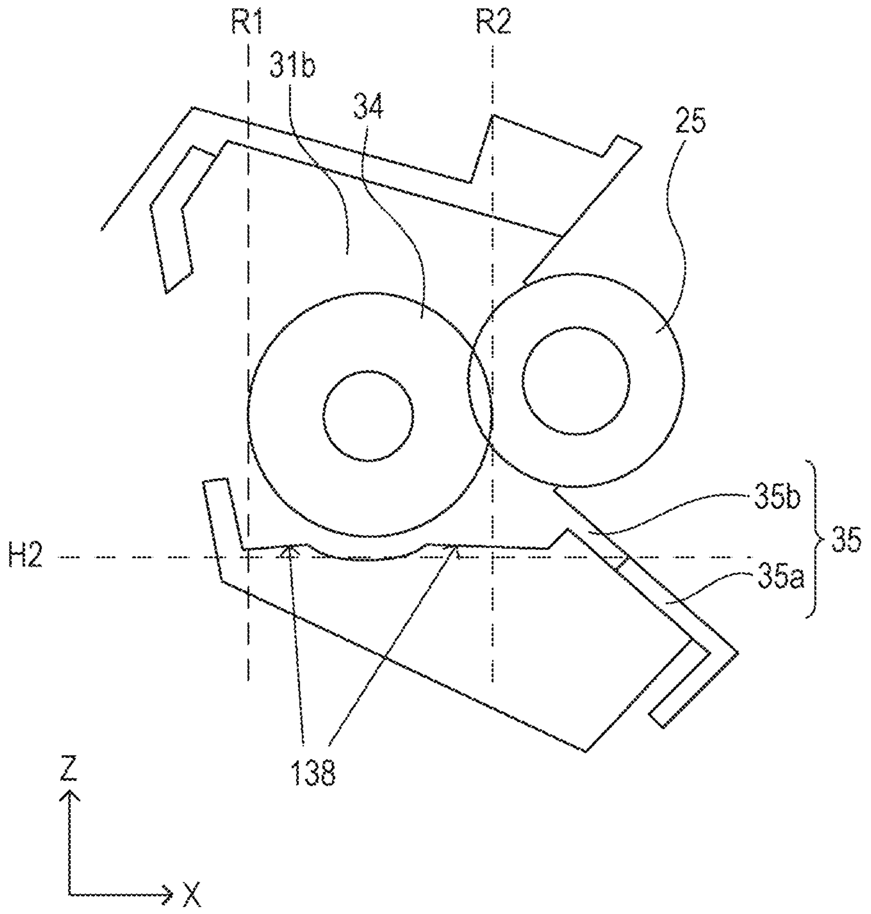
FIG. 7 is a view describing a positional relationship between an inner wall of the developing chamber and a support end of the developing blade according to examples to which the present disclosure can be applied.

Here, the developing blade 35 of the present example will be described in detail. In the present example, the developing blade 35 is formed of a supporting plate 35*a* (blade supporting portion) obtained by processing stainless steel and a plate-like member 35*b* (blade portion) having flexibility as shown in FIG. 7. The plate-like member is integrated with the supporting plate by performing YAG laser welding. FIG. 4 is a conceptual view showing a transverse direction of the developing blade 35 at a free end tip portion according to the present disclosure. A surface 811 of FIG. 4 is a surface that mainly comes into contact with the developing roller 25.

Figure 3:
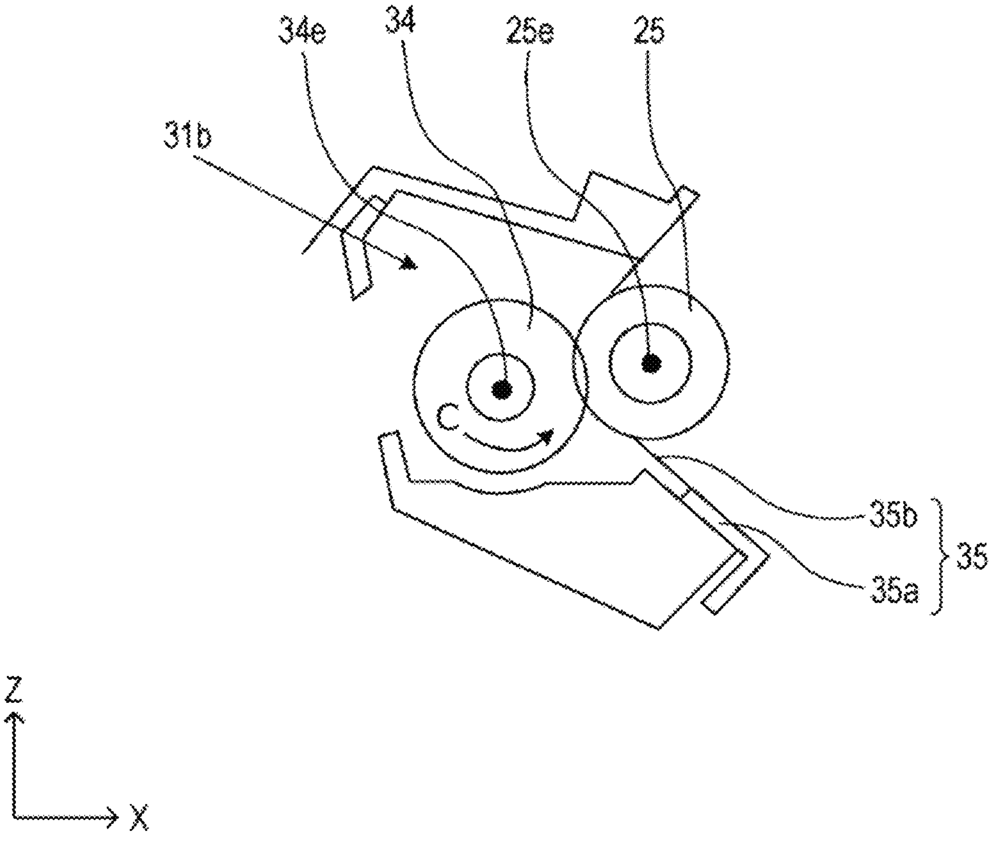
FIG. 3 is a schematic cross sectional view showing a developing chamber according to examples to which the present disclosure can be applied.

FIG. 3 is an enlarged schematic cross-sectional view showing the inside of the developing chamber 31*b*, and shows a configuration in which the problem of the present disclosure occurs. Although the details will be described below, the toner supplying roller 34 supplies the toner to the developing roller 25 by rotating in a C direction, but since an upward component is provided at a contact portion between the developing roller 25 and the toner supplying roller 34, the problem may be caused by the configuration that is disadvantageous for supplying the toner to the developing roller because the toner to be supplied is affected by gravity.

In the present embodiment, a part of a "tip edge portion 818" on a side to come into contact with the developing roller 25 is scraped off by polishing processing on a tip (free end) side of the plate-like member 35*b* as shown in FIG. 4. A portion formed by being scraped off is formed on the entire longitudinal area of the plate-like member.

The developing blade 35 is provided at a free end of the plate-like member 35*b* in the transverse direction and includes a contact portion for coming into contact with the surface of the developing roller 25.

More specifically, before the tip of the developing blade 35 is subjected to polishing processing, a first surface 811 (first portion) that is a surface on a side to come into contact with the developing roller 25 intersects with a third surface 813 (third portion) orthogonal to the first surface 811 on a cross section orthogonal to the longitudinal direction to form "tip edge portion 818" described above. Further, the tip edge portion 818 is scraped off by performing polishing processing so that a second surface 812 (second portion) connects the first surface 811 with the third surface 813 is formed. A tip point of the first surface 811 on a free end side is defined as a point A3, and a tip point of the second surface 812 on a free end side is defined as a point B1 in a state after the polishing processing. Further, a virtual line extending from the first surface 811 in a free end direction is defined as L1. Further, a point where a virtual line L2 orthogonal to the virtual line L1 and passing through the point B1 intersects with the virtual line L1 is defined as a point C1. Here, a distance between the point B1 and the point C1 is defined as h1, and a distance between the point A3 and the point C1 is defined as d1. In the example described below, "h1=15 μm" and "d1=40 μm" are satisfied.

Here, a method of performing polishing processing on the developing blade 35 used in the present disclosure will be described. The plate-like member before being bonded to the support member is fixed to a pedestal in a state of being sandwiched between the pedestal and a pressing member. An abrasive film wound around a rubber roller is in contact with the tip portion of the plate-like member in a state where a load is applied to the abrasive film. In the example described below, a wrapping film sheet with a grain size of #800 is used as the abrasive film, and a load of 500 g is applied to the rubber roller.

The abrasive film on the rubber roller is disposed in a fixed state, and the pedestal moves right and left in the longitudinal direction so that the tip portion of the plate-like member is rubbed against the abrasive film and is thus finely scraped off.

The amount of the plate-like member to be scraped off is proportional to the distance where the plate-like member is rubbed against the abrasive film, and the scraped amount increases as the rubbed distance increases and the scraped amount decreases as the distance decreases. That is, the amount of the tip edge portion of the plate-like member to be scraped off can be changed by controlling the moving amount of the pedestal. The polishing method is merely an example, and the present disclosure is not limited thereto as long as the tip shape of the developing blade can be processed to a desired shape.

Figure 5:
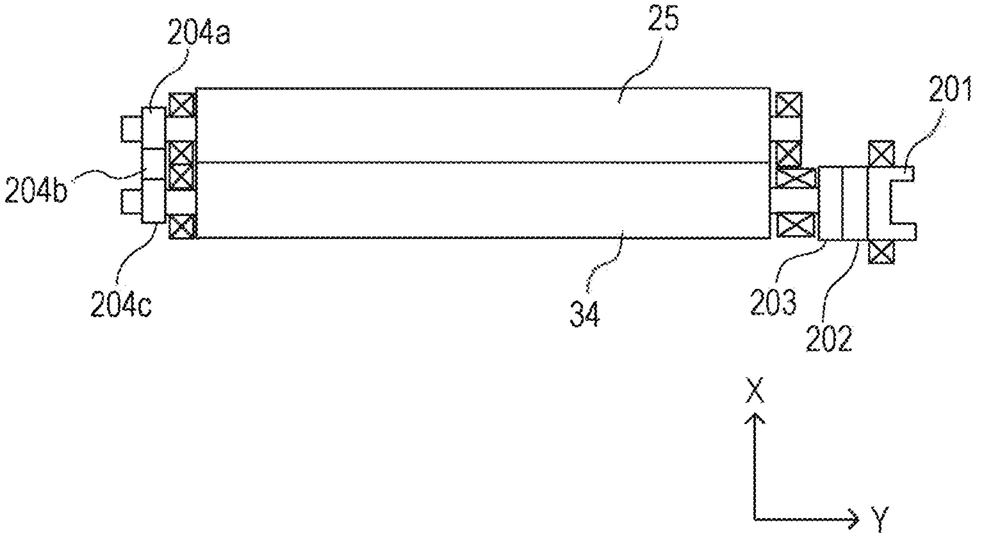
FIG. 5 is a view showing a driving/input method with respect to a toner supplying roller according to examples to which the present disclosure can be applied.
Figure 6:
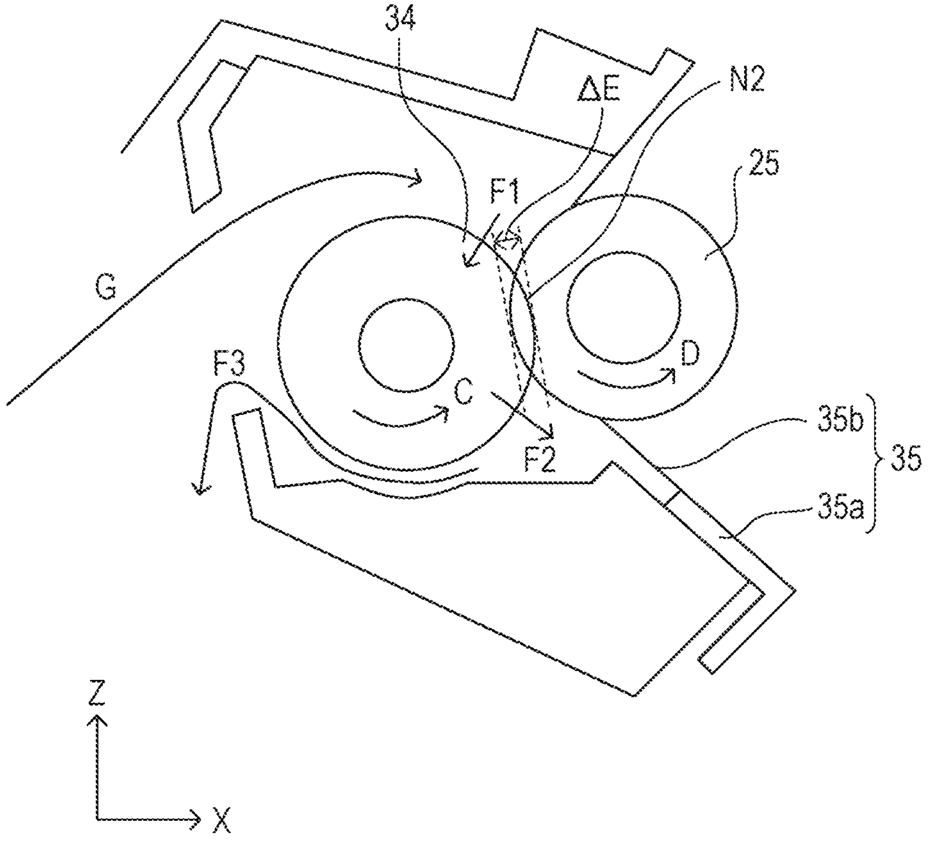
FIG. 6 is a view showing movement of a toner inside a developing device according to examples to which the present disclosure can be applied.

The toner supplying roller 34 is in contact with the developing roller 25 at a nip portion N2 (FIG. 6 shown below), and is rotationally driven in response of the image forming operation by receiving a driving force of a driving motor (not shown). The description thereof will be provided below with reference to FIG. 5.

The driving force from the main body driving motor is transmitted to a coupling 201 (driving force receiving unit) provided at an axial end portion of the toner supplying roller 34, and the driving force is transmitted to the toner supplying roller 34 through an intermediate 202 and a drive transmission member 203 (the intermediate 202 and the drive transmission member 203 are first driving force transmitting units). The driving force of the toner supplying roller 34 is transmitted to the developing roller 25 by gears (204*a* to 204*c*) provided between the toner supplying roller 34 and the developing roller 25 so that the developing roller 25 rotates (the gear 204*c* is a second driving force transmitting unit, and the gear 204*a* is a third driving force transmitting unit). Specifically, the gear 204*c* fixed to the toner supplying roller 34 rotates to transmit the driving force to an idler gear 204*b*, and thus the idler gear 204*b* rotates. When the idler gear 204*b* rotates, the driving force is transmitted to the gear 204*a* fixed to the developing roller 25, and thus the developing roller 25 rotates along with the gear 204*a*.

In the present embodiment shown in FIGS. 1 and 2, the driving force from the apparatus main body 100*a* to the developing unit 4 is input from the longitudinal axial line of the toner supplying roller 34, but in a case where a configuration in which the driving force from the apparatus main body 100*a* to the developing unit 4 is input from the longitudinal axial line of the developing roller 25 is employed, drive input positions for the cleaning unit 26 and the developing unit 4 approach each other because development is performed in a state where the photosensitive drum 1 and the developing roller 25 are in contact with each other. Such disposition of the input unit makes it difficult to simply configure the drive input unit of the apparatus main body 100*a*, which is not suitable when a more stabilized drive input unit is configured at a low cost.

On the contrary, in the present embodiment, since the driving force to the developing unit 4 is input from the longitudinal axial line of the toner supplying roller 34, the distance between the drive input position for the cleaning unit 26 and the drive input position for the developing unit 4 can be increased, which is more suitable when a drive input unit of the apparatus main body 100*a* is configured.

Meanwhile, since the configuration in which the driving force from the apparatus main body 100*a* is transmitted to the developing roller 25 through the toner supplying roller 34 is required to drive the developing roller 25 through a plurality of gears, the rotational stability of the developing roller 25 is degraded as compared with the configuration in which the driving force is transmitted to the developing roller 25. As a result, the regulation force of the developing blade 35 is destabilized in some cases, and thus this configuration is disadvantageous in terms of regulation defects.

Further, the toner supplying roller 34 and the developing roller 25 rotate at the nip portion N2 in opposite directions with a peripheral speed difference, and the toner is supplied to the developing roller 25 while the residual toner on the developing roller 25 is recovered.

In the present disclosure, the rollers rotate such that the peripheral speed ratio R represented by Equation (E1) satisfies "1.1≤R≤2.5" in a case where the peripheral speed of the toner supplying roller 34 at the nip portion N2 is defined as $V_{RS}$, and the peripheral speed of the developing roller 25 is defined as $V_D$.

$$R = V_{RS}/V_D \quad \text{(E1)}$$

(In Equation (E1), $V_{RS}$ represents an absolute value [m/sec] of a peripheral speed of the surface of the toner supplying roller, and $V_D$ represents an absolute value [m/sec] of a peripheral speed of the surface of the developing roller).

That is, a rotational angle speed ratio λ represented by Equation (E2) "λ=ωRS/ωD" between the toner supplying roller 34 and the developing roller 25 satisfies "1.1≤λ×rRS/rD≤2.5" in a case where the radius of the toner supplying roller 34 is defined as rRS and the rotational angle speed thereof is defined as ωRS, and the radius of the developing roller 25 is defined as rD and the rotational angle speed thereof is defined as ωD. Further, in the example described below, since the radius of the toner supplying roller is 3.3 mm and the radius of the developing roller is 3.0 mm, "λ≈1.14" is satisfied.

When the peripheral speed ratio R is set to satisfy "1.1≤R≤2.5", since the rotational speed of the toner supplying roller with respect to the developing roller is high in a case where the development is performed at a high speed, the speed of supplying the toner to the developing roller is sufficiently high or the opposing speed between the developing roller or the toner supplying roller is high, and thus the toner on the developing roller supplied in an aggregated state can be disintegrated by the toner supplying roller. The peripheral speed ratio R is, for example, "1.2≤R≤1.5".

In a case where the peripheral speed ratio R is less than 1.1, the opposing speed between the developing roller and the toner supplying roller is insufficient when the toner is supplied to the developing roller in an aggregated state, and thus the toner is insufficiently disintegrated. Therefore, the state of coating on the developing roller is disturbed, and as a result, the charging uniformity is disturbed and thus fogging occurs. Meanwhile, in a case where the peripheral speed ratio R is greater than 2.5, the disintegration properties of the toner on the developing roller are sufficient, but the toner is insufficiently supplied onto the developing roller because the toner supplying roller rotates at a speed exceeding the speed of supplying the toner to the developing chamber. Therefore, the image density is likely to be decreased, and a difference in in-plane density is likely to occur due to insufficient stability of toner supply.

Further, the recovery amount of the residual toner on the developing roller 25 and the amount of the toner to be supplied to the developing roller 25 can be adjusted by adjusting the potential difference between the toner supplying roller 34 and the developing roller 25.

Further, the toner supplying roller 34 and the developing roller 25 are in contact with each other with a predetermined inroad amount, that is, a recess amount ΔE in which the toner supplying roller 34 is formed into a recess shape by the developing roller 25.

The toner supplying roller 34 includes a conductive support and a foam layer supported by the conductive support. Specifically, the toner supplying roller 34 is provided with a core metal electrode having an outer diameter of φ5 (mm) as a conductive support and a urethane foam layer as a foam layer formed of an open-cell body (open-cell) formed by air bubbles being connected in the periphery of the core metal electrode, and rotates in a direction indicated by C in the figure. When urethane of the surface layer is formed into an open-cell body as described above, a large amount of toner can enter the inside of the toner supply roller 34. Further, the resistance of the toner supplying roller 34 in the example described below is $1 \times 10^9$ (Ω).

Further, in the example described below, the inroad amount of the toner supplying roller 34 to the developing roller 25, that is, a recess amount ΔE in which the toner supplying roller 34 is formed into a recess shape by the developing roller 25 is set to 1.0 mm.

Here, a method of measuring the resistance of the toner supplying roller 34 will be described. The toner supplying roller 34 comes into contact with an aluminum sleeve having a diameter of 30 mm such that the inroad amount described below reaches 1.5 mm. When the aluminum sleeve rotates, the toner supplying roller 34 rotates in conjunction with the aluminum sleeve at 30 rpm.

Next, a DC voltage of −50 V is applied to the developing roller 25. In this case, a resistor of 10 kΩ is provided on an earth side, and the resistance of the toner supplying roller 34 is calculated by measuring the voltage at both ends of the resistor and calculating the current. In the present embodiment, the surface cell diameter of the toner supplying roller 34 is set to be in a range of 50 μm to 1000 μm.

Here, the cell diameter denotes the average diameter of foam cells in an optional cross section, and the maximum cell diameter is obtained by measuring the area of the maximum foam cell from an enlarged image of the optional cross section and converting this area into a perfect circle-equivalent diameter. Further, the average diameter is an average value of respective cell diameters similarly converted from cell areas of respective remaining cells after foam cells having a cell diameter of ½ or less of the maximum cell diameter are eliminated as noise.

The toner supplied to the surface of the developing roller 25 from the toner supplying roller 34 is frictionally charged by friction between the developing blade 35 and the developing roller 25, and the layer thickness is regulated at the same time as the application of the electric charge. Thereafter, the toner is conveyed to the contact portion (developing unit) between the photosensitive drum 1 and the developing roller 25, and transferred to a bright area potential portion. The residual toner remaining on the surface of the developing roller 25 is returned to the inside of a developing container again, recovered from the surface of the developing roller 25 by the toner supplying roller 34, and accumulated inside of the toner supplying roller 34.

Here, the flow of the toner inside the developing chamber 31*b* will be described with reference to FIG. 6. FIG. 6 is an enlarged schematic cross-sectional view showing the inside of the developing chamber 31*b*, and shows movement of the toner conveyed to the toner supplying roller 34 by a toner conveying member 36 shown in FIG. 2.

Some of the toner G conveyed to an upper portion of the toner supplying roller 34 by the toner conveying member 36 is sucked into the toner supplying roller 34 due to restoration of the toner supplying roller 34 downstream of the nip portion N2 in the rotation direction of the toner supplying roller 34 (F1), and accumulated inside the toner supplying roller 34 along with the residual toner accumulated inside the toner supplying roller 34 recovered from the surface of the developing roller 25. Further, the toner is conveyed downstream of the nip portion N2 in the rotation direction of the toner supplying roller 34 due to the rotation of the toner supplying roller 34 in the direction indicated by C. The toner accumulated inside the toner supplying roller 34 is ejected due to deformation of the toner supplying roller 34 caused when the toner supplying roller 34 comes into contact with the developing roller 25 downstream in the rotation direction of the toner supplying roller 34 (F2).

The toner that has not reached the surface of the developing roller 25 in the toner ejected from the toner supplying roller 34 is gradually conveyed by the propulsive force in a direction of a developing opening (opening portion) due to the jetting force caused by the ejection from the toner supplying roller 34, passes through the developing opening, and is returned to the toner accommodating chamber 31*a* (F3).

When the toner is satisfactorily circulated between the developing chamber 31*b* and the toner accommodating chamber 31*a* as described above, deterioration of the toner is suppressed, occurrence of aggregation of the toner is suppressed even in a case where an image with a low printing ratio is continuously output, and thus a high-quality image can be stably output.

Here, when the flow (F3) of the toner returning to the toner accommodating chamber 31*a* is insufficient, the toner is compressed and aggregated in a region below the toner supplying roller 34 and the developing roller 25. In this manner, the toner enters the nip portion N2 between the toner supplying roller 34 and the developing roller 25, and the contact of the toner supplying roller 34 with the developing roller 25 is insufficient. A region where the residual toner on the developing roller 25 cannot be sufficiently recovered by the toner supplying roller 34 is generated, a specific toner is carried around by the developing roller 25 and passes through the contact portion between the developing blade 35 and the developing roller 25 more than necessary, and thus an over-charged toner is generated. As a result, the adhesion force of the toner exceeds the regulation force of the developing blade 35, and accordingly, regulation defects occur in some cases.

Such a phenomenon is likely to occur, for example, in a case where an image with a low printing ratio is continuously output in a low-temperature and low-humidity environment. This is because the residual toner recovered from the developing roller 25 by the toner supplying roller 34 is accumulated in the developing chamber 31*b*. Since the residual toner recovered from the developing roller 25 is charged, the toner is likely to be electrostatically aggregated. In this manner, the flowability of the toner inside the developing chamber 31*b* is degraded, the flow (F3) of the toner returning to the toner accommodating chamber 31*a* is insufficient, and the toner is likely to be aggregated in a region below the toner supplying roller 34 and the developing roller 25.

In order to deal with this, a method of disposing the toner conveying member below the toner supplying roller 34 inside the developing chamber 31*b* to create the flow (F3) of the toner returning to the toner accommodating chamber 31*a* may be used. However, since toner deterioration is accelerated due to the friction between the toner and the toner conveying member inside the developing chamber 31*b* when the toner conveying member is provided inside the developing chamber 31*b*, toner melt adhesion to the developing roller 25 is observed in a case where an image with a low printing ratio is continuously output. Further, the toner conveying member is required to be provided as an additional member in addition to the toner supplying roller 34 inside the developing chamber 31*b*, and thus the configuration of the apparatus is complicated. Therefore, in the example described below, no members that are driven by motor drive are disposed inside the developing chamber 31*b* in addition to the developing roller 25 and the toner supplying roller 34.

Further, in the configuration in which no members other than the developing roller 25 and the toner supplying roller 34 are disposed inside the developing chamber 31*b*, the inner wall of the developing chamber 31*b* is set as follows with respect to the toner supplying roller 34 in order to efficiently use the toner inside the developing chamber 31*b*. The description will be provided in detail with reference to FIG. 7.

R1 and R2 in FIG. 7 are tangents (vertical lines) to the outer peripheral surface of the toner supplying roller 34, which extend in the vertical direction. Further, a horizontal line H2 is a horizontal line passing through a support end of the developing blade 35. At least a part of a region between R1 an R2 on the inner wall of the developing chamber 31*b* is above the horizontal line H2 in the vertical direction (region 138 in the figure). In this manner, the amount of the toner remaining in the developing chamber 31*b* without being used for printing can be further reduced, and the toner inside the developing chamber 31*b* can be more efficiently used.

Further, as shown in FIG. 2, a blowout prevention sheet 20 is disposed as a developer contact sheet for preventing the toner from leaking from the developing frame 31 in contact with the developing roller 25.

Further, the toner accommodating chamber 31*a* of the developing frame 31 is provided with the toner conveying member 36 for stirring the contained toner and conveying the toner to the toner supplying roller 34. As shown in FIG. 2, the toner conveying member 36 is formed of a stirring shaft 36*a* that can rotate by a driving force from the apparatus main body 100*a* and a sheet member 36*b* that is attached to the stirring shaft 36*a* and rotates along with the stirring shaft 36*a*, and the sheet member 36*b* has elasticity.

Next, the toner conveyance of the developing unit will be described. The sheet member 36*b* of the toner conveying member in the toner accommodating chamber 31*a* is provided such that the free end of the toner conveying member is in contact with the wall surface of the toner accommodating unit in a region K upstream of the opening portion 31*c* (communication port) in the rotation direction of the toner conveying member. Further, the sheet member 36*b* is deformed against elasticity as the toner conveying member rotates such that the free end side rather than the rotation axis side is upstream in the rotation direction of the toner conveying member.

That is, the sheet member 36*b* comes into contact with a deforming unit 31*al* on the inner surface of the toner accommodating unit in accordance with the rotation thereof. In this manner, the sheet member 36*b* receives a force from the deforming unit 31*a*1. As a result, the sheet member 36*b* is deformed against the elastic force of the sheet member 36*b*. Further, the sheet member 36*b* rotates in a state of being in contact with the deforming unit 31*a*1, the toner is conveyed in a state of being carried on the surface downstream in the rotation direction thereof. In the present embodiment, the deforming unit 31*al* denotes a site (also referred to as a region K) of the inner wall of the toner accommodating chamber as shown in FIG. 2, from which the sheet member 36*b* is separated.

Further, the free end of the toner conveying member is released from the contact with the wall surface of the toner accommodating unit in a predetermined position (also referred to as a position B) in a restoring unit 31*a*2 downstream of the region K in the rotation direction of the toner conveying member and upstream of the opening portion in the rotation direction of the toner conveying member. In this case, the deformed toner conveying member is elastically restored, and the conveyed toner flies toward the communication port. In the present embodiment, the restoring unit 31*a*2 is disposed above the horizontal surface of the stirring member including the rotation axis.

Therefore, the contact of the restoring unit 31*a*2 with the inner wall of the sheet member 36*b* is released after the tip of the sheet member on the free end side passes through the deforming unit 31*al* as the sheet member 36*b* rotates. In this manner, the sheet member 36*b* is released from a state of being deformed by the deforming unit 31*a*1 and is restored to a natural state (original shape) by the elastic restoration force of the sheet member 36*b*. The toner conveyed by being carried on the sheet member 36*b* due to a change in shape of the sheet member 36*b* in the restoration direction flies against gravity toward the opening portion 31*c*. The opening portion 31*c* is positioned downstream of the restoring unit 31*a*2 in the rotation direction of the sheet member 36*b*. Some of the toner flied toward the opening portion 31*c* is conveyed to the developing chamber 31*b*. Meanwhile, the toner that has not reached inside the developing chamber 31*b* falls into the toner accommodating chamber 31*a*, remains at the bottom of the toner accommodating chamber 31*a*, and is returned to the original state again. The toner is stirred and conveyed by repeating this cycle.

Further, the boundary portion between the deforming unit 31*a*1 and the restoring unit 31*a*2 is below the lower end of the opening portion 31*c* (communication port), the rotation center of the toner conveying member 36 and the rotation center of the developing roller 25 are positioned on the same side with respect to the vertical line passing through the boundary portion as viewed in the axial line direction of the developing roller 25, and the maximum value of the radius of rotation of the toner conveying member 36 is greater than the distance between the rotation center of the conveying member and the lower end of the communication port.

The configuration in which the deforming unit 31*a*1 and the restoring unit 31*a*2 described above are provided is a configuration advantageous for increasing the efficiency of conveying the toner to the developing chamber 31*b*, but this configuration is likely to disrupt the flow (F3) of the toner returning to the toner accommodating chamber so that the regulation defects tend to occur.

In the examples described below, the length of the rotation axis of the sheet member 36*b* in the natural state in the radius direction of rotation is set to be greater than the distance from the rotation axis to the lower end of the developing opening in the same direction. The present configuration is advantageous for increasing the efficiency of conveying the toner to the developing chamber 31*b*, but is likely to disrupt the flow (F3) of the toner returning to the toner accommodating chamber 31*a* so that the regulation defects tend to occur.

Further, in the examples described below, two sets of sheet members 36*b* are attached in a position shifted from the attachment direction on the stirring shaft 36*a* in order to enable a sufficient amount of toner to be conveyed to the developing chamber 31*b* from the toner accommodating chamber 31*a*. The present configuration is advantageous for increasing the efficiency of conveying the toner to the developing chamber 31*b*, but is likely to disrupt the flow (F3) of the toner returning to the toner accommodating chamber 31*a* so that the regulation defects tend to occur.

Toner

Next, the toner according to the present disclosure will be described in detail.

The above-described problems can be solved by the toner exhibiting the following characteristics in the cartridge configuration described above.

That is, the toner contains a toner particle and a silica fine particle, the toner particle contains a crystalline resin component, the content of the silica fine particle in the toner is 1.5 parts by mass or greater and 5.0 parts by mass or less with respect to 100 parts by mass of the toner particle, the toner has an aggregation degree of 70.0% or greater and 99.0% or less, and in a case where the average area ratio of a domain of the crystalline resin component in a surface layer region to a depth of 200 nm from a surface of the toner particle is defined as As when a cross section of the toner particle is observed using a transmission electron microscope, As is 1.0% by area or less.

Here, the toner of the cartridge according to the present disclosure has a high aggregation degree of 70.0% or greater and 99.0% or less. In a case where the aggregation degree of the toner is in the above-described ranges, the toner is carried on the surface of the toner supplying roller in a state of an aggregate is formed so that the amount of the toner to be supplied to the developing roller increases and high density stability is exhibited in the cartridge configuration according to the present disclosure. In a case where the aggregation degree is less than 70.0%, the aggregate of the toner carried by the toner supplying roller is collapsed when the toner is supplied at a high speed, the toner conveyance force is insufficient, and thus the density stability is degraded. Meanwhile, in a case where the aggregation degree is higher than 99.0%, the aggregation force of the toner is extremely high, and thus the toner on the developing roller is difficult to disintegrate using the toner supplying roller. As a result, the coating properties on the developing roller are disturbed, the toner is unstably charged, and accordingly, fogging is likely to occur. The aggregation degree of the toner is, for example, 75.0% or greater and 97.5% or less and, for example, 80.0% or greater and 95.0% or less.

Further, it is suggested that a high aggregation force is exhibited by the contact between the surfaces of the toner particles when the toner particles come into contact with each other. Therefore, the aggregation degree greatly depends on the amount of the silica fine particles that impart the flowability to the toner.

Further, when As is 1.0% by area or less in a case where the average area ratio of a domain of the crystalline resin component in the surface layer region to a depth of 200 nm from the surface of the toner particle is defined as As in observation of a cross section of the toner particle using a transmission electron microscope, the disintegration properties of the toner aggregate at the nip portion between the developing roller and the toner supplying roller are excellent, the coating uniformity of the toner supplied to the developing roller is enhanced, and thus fogging is unlikely to occur.

The domain of the crystalline resin component is a site where the crystalline resin component is in a crystallized state. In addition, non-crystallized crystalline resin components are made compatible in the periphery of the domain of the crystalline resin component. Therefore, the resin in the periphery of the domain of the crystalline resin component has mechanical strength and heat resistance that are more degraded than those of the resin in a site where the domain is not present. In the present disclosure, it is assumed that the disintegration properties of the toner particles in an aggregated state are enhanced due to the absence of the domain of the crystalline resin component in the periphery of the toner surface.

Therefore, excellent disintegration properties are exhibited under pressure while high aggregating properties are maintained, by controlling the toner particles in a state where the domain of the crystalline resin component present in the vicinity of the surface of the toner particles is not present in the vicinity of the surface layer. Meanwhile, in a case where As is greater than 1.0% by area, a large amount of crystals of the crystalline resin component are present in the surface layer, and thus the aggregation force is decreased. Therefore, the disintegration properties are degraded. Further, the disintegration properties are further supported by the amount of the silica fine particles. In addition As is, for example, 0.5% by area or less.

Further, when the average area ratio of the toner particle surface portion that is not covered with the silica fine particles as observed with a scanning electron microscope (SEM) is defined as an exposure ratio Bs in the toner used for the cartridge according to the present disclosure, the exposure ratio Bs is, for example, 55.0% by area or greater and 80.0% by area or less.

The exposure ratio Bs may be in the above-described range from the viewpoint that more satisfactory disintegration properties are exhibited while the aggregation degree of the toner is controlled to be in a suitable range. The exposure ratio Bs is, for example, 60.0% by area or greater and 75.0% by area or less.

Further, in order to achieve the amount of the external additive and the exposure ratio Bs described above, the number average value of the major axis of the silica fine particles is, for example, 30 nm or greater and 150 nm or less and, for example, 50 nm or greater and 120 nm or less.

Next, the crystalline resin component will be described.

The crystalline resin component denotes a material having an endothermic pick when measured in conformity with ASTM D3418-82 using a differential scanning calorimeter (for example, “Q1000”, manufactured by TA Instruments). The crystalline resin component denotes an additive containing a component crystallized in the resin contained in the toner particles.

The domain of the crystalline resin component can be controlled by the compatibility between the resin and the crystalline resin component contained in the toner, and cooling conditions and an annealing step of promoting crystallization of the crystalline resin component in the toner producing step.

Specifically, the crystalline resin component denotes a known wax and a crystalline resin. Particularly, a crystalline resin component such as ester wax or crystalline polyester is suitable. These materials are compatible with resins used in the toner particles, such as a styrene acrylic resin and a polyester resin and undergo phase separation in the toner to form a crystal state. Both high aggregation properties and excellent disintegration properties are exhibited by eliminating exposure of these crystalline components.

The toner particles may contain amorphous polyester. The weight-average molecular weight of the amorphous polyester is, for example, 25000 or greater and 75000 or less.

The amorphous polyester can exhibit an aggregation force through an interaction due to the polarity of the ester group in order to form a resin structure using an ester group. The disintegration properties are excellent in a case where the weight-average molecular weight thereof is 25000 or greater, and the aggregation force is increased, which is excellent, in a case where the weight-average molecular weight thereof is 75000 or less.

Further, the acid value of the amorphous polyester is, for example, 10.0 mgKOH/g or greater and 30.0 mgKOH/g or less.

The charging stability is excellent in a case where the acid value of the amorphous polyester is 10.0 mgKOH/g or greater, and the electrostatic aggregation is suppressed and the disintegration properties of the aggregate are excellent in a case where the acid value thereof is 30.0 mgKOH/g or less. Therefore, more excellent performance of suppressing fogging can be obtained by setting the acid value of the amorphous polyester to 10.0 mgKOH/g or greater and 30.0 mgKOH/g or less.

The toner particles may contain boron, and the amount of boron to be present in the toner particles is, for example, 0.1 ppm by mass or greater and 100 ppm by mass or less from the viewpoint of obtaining toner particles with a high aggregation force and excellent disintegration properties.

The reason for this is considered to be that boron atoms interact with a large number of ester groups of a polyester resin because boron atoms have a high ionization potential so that a covalent bond is easily formed. As a result, it is assumed that the polyester having boron atoms forms a pseudo-crosslinked state and can impart elasticity while the viscosity of the resin is maintained. Particularly in a case where boron forms an oxide, the oxide is amphoteric, and thus is likely to strongly interact with a carboxylic acid of the polyester and enters a satisfactory state in terms of the toner aggregation force due to the adhesiveness and the disintegration properties due to the elasticity of the polyester resin.

The amount of boron atoms to be present in the toner particles is, for example, 1.0 ppm by mass or greater and 30.0 ppm by mass or less.

Constituent Component of Toner

Each component constituting the toner and a method of producing the toner will be described in more detail below.

Resin

The toner particles contain a resin. The content of the resin is, for example, 50% by mass or greater with respect to the total amount of the resin component in the toner particles.

The resin is not particularly limited, and examples thereof include a styrene acrylic resin, an epoxy resin, a polyester resin, a polyurethane resin, a polyamide resin, a cellulose resin, a polyether resin, and a mixed resin and a composite resin of these resins. Among these, a styrene acrylic resin and a polyester resin are suitable from the viewpoints of low cost, availability, and excellent low-temperature fixability.

Polyester Resin

The polyester resin can be obtained by selecting suitable compounds from among a polycarboxylic acid, a polyol, a hydroxycarboxylic acid, and the like, combining the compounds, and synthesizing the combined compounds by a known method of the related art, such as a transesterification method or a polycondensation method.

The polycarboxylic acid is a compound containing two or more carboxy groups in a molecule. Among examples of the polycarboxylic acid, a dicarboxylic acid is a compound containing two carboxy groups in one molecule and can be used.

Examples of the dicarboxylic acid include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and cyclohexanedicarboxylic acid.

Examples of the polycarboxylic acid other than the dicarboxylic acid include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid, and n-octenylsuccinic acid. There may be used alone or in combination of two or more kinds thereof.

The polyol is a compound containing two or more hydroxyl groups in one molecule. Among examples of the polyol, the diol is a compound containing two hydroxyl groups in one molecule, and can be used.

Specific examples of the polyol include ethylene glycol, diethylene glycol, triethylene glycol, 1,2-propylene glycol, 1,3-hexanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, diethylene glycol, triethylene glycol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, 1,4-cyclohexanediol, polytetramethylene glycol, hydrogenated bisphenol A, bisphenol A, bisphenol F, bisphenol S, and alkylene oxide (ethylene oxide, propylene oxide, and butylene oxide) adducts of the above-described bisphenols.

Among these, alkylene glycol having 2 to 12 carbon atoms and alkylene oxide adducts of bisphenols are suitable, and combinations of alkylene oxide adducts of bisphenols and alkylene glycol having 2 to 12 carbon atoms is particularly suitable.

Examples of the tri- or higher valent include glycerin, trimethylolethane, trimethylolpropane, pentaerythritol, hexamethylolmelamine, hexaethylolmelamine, tetramethylol benzoguanamine, tetraethylol benzoguanamine, sorbitol, trisphenol PA, phenol novolac, cresol novolac, and alkylene oxide adducts of the above-described tri- or higher valent polyphenols. These may be used alone or in combination of two or more kinds thereof.

Styrene Acrylic Resin

Examples of the styrene acrylic resin include homopolymers formed of the following polymerizable monomers, copolymers obtained by combining two or more kinds of homopolymers, and mixtures thereof.

Examples of the styrene acrylic resin include a styrene-based monomer such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, or p-phenylstyrene; a (meth)acrylic monomer such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth) acrylic acid, or maleic acid; a vinyl ether-based monomer such as vinyl methyl ether or vinyl isobutyl ether; a vinyl ketone-based monomer such as vinyl methyl ketone, vinyl ethyl ketone, or vinyl isopropenylketone; and polyolefins such as ethylene, propylene, and butadiene.

A polyfunctional polymerizable monomer can be used as the styrene acrylic resin as necessary. Examples of the polyfunctional polymerizable monomer include diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, neopentyl glycol di(meth)acrylate, tripropylene glycol di(meth) acrylate, polypropylene glycol di(meth)acrylate, 2,2'-bis(4-((meth)acryloxydiethoxy)phenyl)propane, trimethylolpropane tri(meth)acrylate, tetramethylolmethane tetra(meth)acrylate, divinylbenzene, divinylnaphthalene, and divinyl ether.

Further, a known chain transfer agent and a known polymerization inhibitor can be further added to the toner in order to control the polymerization degree.

Examples of a polymerization initiator for obtaining the styrene acrylic resin include an organic peroxide-based initiator and an azo-based polymerization initiator.

Examples of the organic peroxide-based initiator include benzoyl peroxide, lauroyl peroxide, di-α-cumyl peroxide, 2,5-dimethyl-2,5-bis(benzoylperoxy)hexane, bis(4-t-butylcyclohexyl)peroxydicarbonate, 1,1-bis(t-butylperoxy)cyclododecane, t-butylperoxymaleic acid, bis(t-butylperoxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide, and tert-butyl peroxypivalate.

Examples of the azo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobismethylbutyronitrile, and 2,2'-azobis-(methylisobutyrate).

Further, a redox-based initiator obtained by combining an oxidizing substance and a reducing substance can also be used as the polymerization initiator.

Example of the oxidizing substance include hydrogen peroxide, an inorganic peroxide of a persulfate (a sodium salt, a potassium salt, or an ammonium salt), and an oxidizing metal salt of a tetravalent cerium salt.

Examples of the reducing substance include a reducing metal salt (a divalent iron salt, a monovalent copper salt, or a trivalent chromium salt, ammonia, a lower amine (an amine having 1 or more and 6 or less carbon atoms, such as methylamine or ethylamine), an amino compound such as hydroxylamine, a reducing sulfur compound such as sodium thiosulfate, sodium hydrosulfite, sodium hydrogen sulfite, sodium sulfite, or sodium formaldehyde sulfoxylate, lower alcohol (having 1 or more and 6 or less carbon atoms), ascorbic acid or a salt thereof, and a lower aldehyde (having 1 or more and 6 or less carbon atoms).

The polymerization initiator is selected with reference to a 10-hr half-life temperature, and is used alone or in the form of a mixture.

The amount of the polymerization initiator to be added changes depending on the target polymerization degree, but is typically 0.5 parts by mass or greater and 20.0 parts by mass or less with respect to 100.0 parts by mass of the polymerizable monomer.

Release Agent

A known wax can be used in the toner as a release agent.

Specific examples thereof include petroleum-based waxes such as paraffin wax, microcrystalline wax, and petrolatum, and derivatives thereof, montan waxes and derivatives thereof, hydrocarbon waxes obtained by using the Fischer-Tropsch method and derivatives thereof, polyolefin waxes such as polyethylene and derivatives thereof, and natural waxes such as carnauba wax and candelilla wax and derivatives thereof, and the derivatives include oxides, block copolymers with vinyl monomers, and graft modified products.

Further, examples of the waxes include alcohols such as higher aliphatic alcohol; fatty acids such as stearic acid and palmitic acid, acid amides, esters, and ketones thereof; hydrogenated castor oil and derivatives thereof, vegetable waxes, and animal waxes. These may be used alone or in combination.

Among these, polyolefin, hydrocarbon wax obtained by using the Fischer-Tropsch method, or petroleum-based wax can be used from the viewpoint that the developability and the transferability tend to be improved. Further, an antioxidant may be added to these waxes in a range where the characteristics of the toner are not affected.

Further, from the viewpoints of the phase separation properties with respect to the resin and the crystallization temperature, suitable examples thereof include higher fatty acid esters such as behenyl behenate and dibehenyl sebacate.

The content of the release agent is, for example, 1.0 parts by mass or greater and 30.0 parts by mass or less with respect to 100.0 parts by mass of the resin.

The melting point of the release agent is, for example, 30° C. or higher and 120° C. or lower and, for example, 60° C. or higher and 100° C. or lower. In a case where a release agent having a melting point of 30° C. or higher and 120° C. or lower is used, a release effect is efficiently exhibited, and a wider fixing region is ensured.

Plasticizer

A crystalline plasticizer in the toner can be used for improving sharp melt properties. The plasticizer is not particularly limited, and known plasticizers used in toners as described below can be used.

Examples of the plasticizer include esters of monohydric alcohol and aliphatic carboxylic acid, such as behenyl behenate, stearyl stearate, and palmityl palmitate, or esters of carboxylic acid and aliphatic alcohol; esters of dihydric alcohol and aliphatic carboxylic acid, such as ethylene glycol distearate, dibehenyl sebacate, and hexanediol dibehenate, or esters of carboxylic acid and aliphatic alcohol; esters of trihydric alcohol and aliphatic carboxylic acid, such as glycerin tribehenate, or esters of trihydric carboxylic acid and aliphatic alcohol; esters of tetrahydric alcohol and aliphatic carboxylic acid, such as pentaerythritol tetrastearate and pentaerythritol tetrapalmitate, or esters of tetrahydric carboxylic acid and aliphatic alcohol; esters of hexahydric alcohol and aliphatic carboxylic acid, such as dipentaerythritol hexastearate and dipentaerythritol palmitate, or esters of hexahydric carboxylic acid and aliphatic alcohol; esters of polyhydric alcohol and aliphatic carboxylic acid, such as polyglycerin behenate, or esters of polyhydric carboxylic acid and aliphatic alcohol; and natural ester waxes such as carnauba wax and rice wax. These may be used alone or in combination.

Colorant

The toner particles may contain a colorant. A known pigment or a known dye can be used as the colorant. From the viewpoint of excellent weather resistance, a pigment is suitable as the colorant.

Examples of a cyan-based colorant include a copper phthalocyanine compound and a derivative thereof, an anthraquinone compound, and a base dye lake compound. Specific examples thereof include C.I. Pigment Blue 1, 7, 15, 15:1, 15:2, 15:3, 15:4, 60, 62, and 66.

Examples of a magenta-based colorant include a condensed azo compound, a diketopyrrolopyrrole compound, an anthraquinone compound, a quinacridone compound, a base dye lake compound, a naphthol compound, a benzimidazolone compound, a thioindigo compound, and a perylene compound. Specific examples thereof include C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254, and C.I. Pigment Violet 19.

Examples of a yellow-based colorant include a condensed azo compound, an isoindolinone compound, an anthraquinone compound, an azo metal complex, a methine compound, and an allylamide compound. Specific examples thereof include C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of a black colorant include colorants toned to black using the yellow-based colorant, the magenta-based colorants, and the cyan-based colorants described above, and carbon black.

These colorants can be used alone or in the form of a mixture, and can also be used as a solid solution.

The content of the colorant is, for example, 1.0 parts by mass or greater and 20.0 parts by mass or less with respect to 100.00 parts by mass of the resin.

Charge Control Agent and Charge Control Resin

The toner particles may contain a charge control agent or a charge control resin.

As the charge control agent, a known charge control agent can be used, and particularly a charge control agent that has a high triboelectric charging speed and is capable of stably maintaining a constant triboelectric charging amount is suitable. Further, in a case where the toner particles are produced by a suspension polymerization method, a charge control agent that has low polymerization inhibition properties and is substantially free from a solubilized substance in an aqueous medium is particularly suitable.

Examples of a charge control agent that controls the toner to be negatively charged include a monoazo metal compound, an acetylacetone metal compound, an aromatic oxycarboxylic acid-based metal compound, an aromatic dicarboxylic acid-based metal compound, an oxycarboxylic acid-based metal compound, a dicarboxylic acid-based metal compound, an aromatic oxycarboxylic acid, an aromatic monocarboxylic acid, an aromatic polycarboxylic acid, and metal salts thereof, anhydrides, esters, phenol derivatives such as bisphenol, urea derivatives, a metal-containing salicylic acid-based compound, a metal-containing naphthoic acid-based compound, a boron compound, a quaternary ammonium salt, a calixarene, an a charge control resin.

Examples of the charge control resin include a polymer or copolymer containing a sulfonic acid group, a sulfonate group, or a sulfonic acid ester group. The polymer containing a sulfonic acid group, a sulfonate group, or a sulfonic acid ester group is particularly suitably a polymer containing 2% by mass or greater of a sulfonic acid group-containing acrylamide-based monomer or a sulfonic acid group-containing methacrylamide-based monomer and more suitably a polymer containing 5% by mass or greater thereof in terms of the copolymerization ratio.

The charge control resin has, for example, a glass transition temperature (Tg) of 35° C. or higher and 90° C. or lower, a peak molecular weight (Mp) of 10000 or greater and 30000 or less, and a weight-average molecular weight (Mw) of 25000 or greater and 50000 or less. In a case where such a charge control resin is used, suitable triboelectric charge characteristics can be imparted to the toner particles without affecting thermal characteristics required for the toner particles. Further, in a case where the charge control resin contains a sulfonic acid group, for example, the dispersibility of the charge control resin and the dispersibility of a colorant and the like in a polymerizable monomer composition are improved, and the coloring power, the transparency, and the triboelectric charge characteristics can be improved.

These charge control agents or charge control resins may be respectively used alone or in combination of two or more kinds thereof for addition.

The amount of the charge control agent or charge control resin to be added is, for example, 0.01 parts by mass or greater and 20.0 parts by mass or less and, for example, 0.5 parts by mass or greater and 10.0 parts by mass or less with respect to 100.0 parts by mass of the resin.

Silica Fine Particles

Dry silica is suitable as the silica fine particles used as an external additive in the toner according to the present disclosure from the viewpoint of easily controlling a shape with a large number of recesses. The dry silica is formed of a silicon halogen compound or the like as a raw material. As the silicon halogen compound, silicon tetrachloride is used, but silanes such as methyl trichlorosilane and trichlorosilane can be used alone or silicon tetrachloride and silanes can be used in a mixed state as a raw material. After vaporization of the raw material, target silica is obtained by a so-called flame hydrolysis reaction of reacting the raw material with water generated as an intermediate in an oxyhydrogen flame. For example, a thermal decomposition oxidation reaction of silicon tetrachloride gas in oxygen and hydrogen is used, and the reaction formula is as follows.

$$SiCl_4+2H_2+O_2 \rightarrow SiO_2+4HCl$$

Hereinafter, a method of producing silica will be described.

Oxygen gas is supplied to a burner to ignite the ignition burner, hydrogen gas is supplied to the burner to form a flame, and silicon tetrachloride which is a raw material is added thereto for gasification. A flame hydrolysis reaction is carried out, and generated silica powder is recovered.

The average particle diameter and the shape can be arbitrarily adjusted to prepare silica particles in a shape with a large number of recesses by appropriately changing a silica tetrachloride flow rate, an oxygen gas supply flow rate, a hydrogen gas supply flow rate, and a retention time of silica in a flame. The shape with a large number of recesses may be controlled by a method of transferring the obtained silica powder to an electric furnace, spreading the silica powder in the form of a thin layer, and performing a heat treatment so that the silica powder is sintered. The coalescence strength of the silica particles is increased when the silica powder is sintered.

Further, the silica particles used in the present disclosure may be subjected to a surface treatment such as a hydrophobic treatment or a silicone oil treatment.

A hydrophobization method is performed by carrying out a chemical treatment with an organic silicon compound that reacts with or physically adsorbs on silica so that hydrophobicity is imparted. As a suitable method, silica generated by vapor phase oxidation of a silicon halogen compound is treated with an organic silicon compound.

Examples of such an organic silicon compound include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilylmercaptan, trimethylsilylmercaptan, triorganosilyl acrylate, vinyldimethylacetoxysilane, dimethylethoxysilane, dimethyldimethoxysilane, diphenyldiethoxysilane, 1-hexamethyldisiloxane, 1,3-divinyltetramethyldisiloxane, 1,3-diphenyltetramethyldisiloxane, and dimethylpolysiloxane.

These may be used alone or in the form of a mixture of two or more kinds thereof.

Further, silicone oil having a viscosity of 30 $mm^2/s$ or greater and 1000 $mm^2/s$ or less at 25° C. can be used as the silicone oil in the silicone oil-treated silica. Examples thereof include dimethyl silicone oil, methyl phenyl silicone oil, α-methyl styrene-modified silicone oil, chlorophenyl silicone oil, and fluorine-modified silicone oil.

Examples of a method of performing the silicone oil treatment include a method of directly mixing silicone oil with silica treated with a silane coupling agent using a mixer such as a Henschel mixer, a method of spraying silicone oil to silica serving as a base, and a method of dissolving or dispersing silicone oil in an appropriate solvent, adding silica thereto, mixing the mixture, and removing the solvent.

In the silicone oil-treated silica, silica after the treatment of silicone oil can be heated at a temperature of 200° C. or higher (for example, 250° C. or higher) in an inert gas and the coating of the surface be stabilized. Suitable examples of the silane coupling agent include hexamethyldisilazane (HMDS).

The amount of the silica fine particles to be added is 1.5 parts by mass or greater and 5.0 parts by mass or less with respect to 100 parts by mass of the toner particles.

The sticking state of the external additive and the coating state of the toner particles with the external additive can be arbitrarily controlled by adjusting the rotation speed (rpm) of the stirring blade provided in an external adder and the external addition time as external addition conditions.

It is effective to increase the rotation speed and the external addition time in order to more firmly stick the toner particles, and particularly the sticking strength can be further increased by increasing the rotation speed. Further, since external additive particles with a small particle diameter form aggregates, the toner particles are subjected to a coating treatment with an external additive while a disintegration treatment is carried out by controlling the external addition conditions. The disintegration properties can be enhanced by increasing the rotation speed and the external addition time, but it is effective to reduce the rotation speed and to increase the external addition time in order to further promote disintegration while suppressing the sticking strength.

Method of Producing Toner

A method of producing the toner is not particularly limited, and the toner can be produced by using a known method such as a pulverization method, a suspension polymerization method, a dissolution suspension method, an emulsion aggregation method, or a dispersion polymerization method. Here, the toner can be produced by an emulsion aggregation method.

The method of producing the toner includes steps (1) to (3) in the following order:

(1) a dispersion step of preparing a resin fine particle dispersion liquid containing the resin, (2) an aggregation step of aggregating resin fine particles contained in the resin fine particle dispersion liquid to form aggregates, and (3) a fusion step of heating and fusing the aggregates, in which a boric acid source is added in at least one of the aggregation step and the fusing step.

Further, in the middle or after the fusion step, steps (4) to (6) can be provided in the following order:

(4) a spheronization step of increasing the temperature and heating the aggregates, (5) a cooling step of cooling the aggregates at a cooling rate of 0.1° C./sec or greater, and (6) an annealing step of heating and holding the aggregates at a temperature higher than or equal to the crystallization temperature of the resin or higher than or equal to the glass transition temperature of the resin.

The toner can be produced by an emulsion aggregation method from the viewpoint of controlling the toner shape and easily uniformly dispersing boric acid in the vicinity of the toner surface. Hereinafter, the emulsion aggregation method will be described in detail.

Emulsion Aggregation Method

The emulsion aggregation method is a method of producing toner particles by preliminarily preparing an aqueous dispersion liquid of fine particles formed of a constituent material of toner particles which are relatively small with respect to the target particle diameter, aggregating the fine particles until the particle diameter of the particles reach the particle diameter of the toner particles in an aqueous medium, and fusing the resin by being heated or the like.

That is, according to the emulsion aggregation method, the toner particles are produced by performing a dispersion step of preparing a fine particle dispersion liquid formed of a constituent material of toner particles, an aggregation step of controlling the particle diameter until the particle diameter of the particles reaches the particle diameter of the toner particles, a fusion step of performing melt adhesion on the resin contained in the obtained aggregated particles, a spheronization step of heating the particles so that the particles are melted and controlling the surface shape of the toner, a subsequent cooling step, a metal removal step of separating the obtained toner by filtration and removing an excess amount of polyvalent metal ions, a filtration and washing step of washing the toner with ion exchange water or the like, and a step of removing the moisture of the washed toner particles and drying the toner particles.

Step of Preparing Resin Fine Particle Dispersion Liquid (Dispersion Step)

The resin fine particle dispersion liquid can be prepared by a known method, but the present disclosure is not limited thereto. Examples of the known method include an emulsion polymerization method, a self-emulsification method, a phase inversion emulsification method of adding an aqueous medium to a resin solution dissolved in an organic solvent to emulsify the resin, and a forced emulsification method of performing a high-temperature treatment in an aqueous medium to forcibly emulsify the resin without using an organic solvent.

Specifically, the resin is dissolved in an organic solvent that can dissolve the resin, and a surfactant and a basic compound are added thereto. In this case, when the resin is a crystalline resin having a melting point, the resin may be dissolved by being heated at the melting point or higher. Next, an aqueous medium is slowly added to the mixture while the mixture is stirred with a homogenizer or the like, to precipitate the resin fine particles. Thereafter, the solvent is removed by heating the mixture or reducing the pressure, thereby preparing an aqueous dispersion liquid of the resin fine particles. Any organic solvent can be used as the organic solvent used for dissolving the resin as long as the organic solvent can dissolve the resin, but an organic solvent that forms a homogeneous phase with water, such as toluene, can be used from the viewpoint of suppressing generation of coarse powder.

The surfactant used for the emulsification is not particularly limited, and examples thereof include an anionic surfactant such as a sulfuric acid ester salt-based surfactant, a sulfonate-based surfactant, a carbonate-based surfactant, a phosphoric acid ester-based surfactant, or a soap-based surfactant; a cationic surfactant such as an amine salt type surfactant or a quaternary ammonium salt type surfactant; and a nonionic surfactant such as a polyethylene glycol-based surfactant, an alkylphenol ethylene oxide adduct-based surfactant, or a polyhydric alcohol-based surfactant. The surfactant may be used alone or in combination of two or more kinds thereof.

Examples of the basic compound used in the dispersion step include an inorganic base such as sodium hydroxide or potassium hydroxide; and an organic base such as ammonia, triethylamine, trimethylamine, dimethylaminoethanol, or diethylaminoethanol. The basic compound may be used alone or in combination of two or more kinds thereof.

Further, the 50% particle diameter (D50) of fine particles of the resin based on volume distribution in the aqueous dispersion liquid of resin fine particles is, for example, in a range of 0.05 μm to 1.0 μm and, for example, in a range of 0.05 μm to 0.4 μm. Toner particles having an appropriate volume average particle diameter of 3 μm to 10 μm are easily obtained by adjusting the 50% particle diameter (D50) thereof based on volume distribution to be in the above-described ranges.

In addition, the 50% particle diameter (D50) of particles based on volume distribution is measured using a dynamic light scattering particle size distribution meter NANOTRAC UPA-EX150 (manufactured by Nikkiso Co., Ltd.).

Colorant Fine Particle Dispersion Liquid

A colorant fine particle distribution liquid may be used as necessary. The colorant fine particle distribution liquid can be prepared by a known method described below, but the present disclosure is not limited thereto. The colorant fine particle distribution liquid can be prepared by mixing a colorant, an aqueous medium, and a dispersant using a known mixer such as a stirrer, an emulsifier, or a disperser. A known dispersant such as a surfactant or a polymer dispersant can be used as the dispersant used here. Both dispersants, the surfactant and the polymer dispersant, can be removed in a washing step described below, but the surfactant is suitable from the viewpoint of washing efficiency.

Examples of the surfactant include an anionic surfactant such as a sulfuric acid ester salt-based surfactant, a sulfonate-based surfactant, a phosphoric acid ester-based surfactant, or a soap-based surfactant; a cationic surfactant such as an amine salt type surfactant or a quaternary ammonium salt type surfactant; and a nonionic surfactant such as a polyethylene glycol-based surfactant, an alkylphenol ethylene oxide adduct-based surfactant, or a polyhydric alcohol-based surfactant. Among these, a nonionic surfactant or an anionic surfactant is suitable. Further, a nonionic surfactant and an anionic surfactant may be used in combination. The surfactant may be used alone or in combination of two or more kinds thereof. The concentration of the surfactant in an aqueous medium is, for example, in a range of 0.5% by mass to 5% by mass.

The content of the colorant fine particles in the colorant fine particle dispersion liquid is not particularly limited, but is, for example, in a range of 1% by mass to 30% by mass with respect to the total mass of the colorant fine particle dispersion liquid.

In the dispersed particle diameter of the colorant fine particle in the aqueous dispersion liquid of the colorant, the 50% particle diameter (D50) based on the volume distribution is, for example, 0.5 μm or less from the viewpoint of the dispersibility of the colorant in the toner to be finally obtained. Further, a 90% particle diameter (D90) based on the volume distribution is, for example, 2 μm or less for the same reason. In addition, the dispersed particle diameter of the colorant fine particles dispersed in the aqueous medium is measured using a dynamic light scattering particle size distribution meter (NANOTRAC UPA-EX150, manufactured by Nikkiso Co., Ltd.).

Examples of the mixer such as a known stirrer, emulsifier, or disperser used when the colorant is dispersed in the aqueous medium include an ultrasonic homogenizer, a jet mill, a pressure homogenizer, a colloid mill, a ball mill, a sand mill, and a paint shaker. These may be used alone or in combination.

Release Agent (Aliphatic Hydrocarbon Compound) Fine Particle Dispersion Liquid

A release agent fine particle dispersion liquid may be used as necessary. The release agent fine particle dispersion liquid can be prepared by a known method described below, but the present disclosure is not limited thereto.

The release agent fine particle dispersion liquid can be prepared by adding a release agent to an aqueous medium containing a surfactant, heating the mixture at a temperature higher than or equal to the melting point of the release agent, dispersing the release agent in the form of particles using a homogenizer (for example, "CLEARMIX W-MOTION", manufactured by M Technique Co., Ltd.) having a strong shearing ability or a pressure ejection type disperser (for example, "GAULIN HOMOGENIZER", manufactured by Gaulin Corporation), and cooling the mixture at a temperature lower than the melting point of the release agent.

In the dispersed particle diameter of the release agent fine particle dispersion liquid in the aqueous dispersion liquid of the release agent, the 50% particle diameter (D50) based on the volume distribution is, for example, in a range of 0.03

μm to 1.0 μm and, for example, in a range of 0.1 μm to 0.5 μm. Further, no coarse particles having a particle diameter of 1 μm or greater may be present.

In a case where the dispersed particle diameter of the release agent fine particle dispersion liquid is in the above-described ranges, the release agent can be present in a state of being finely dispersed in the toner, a bleeding effect during fixation can be maximized, and satisfactory separation properties can be obtained. Further, the dispersed particle diameter of the release agent fine particle dispersion liquid dispersed in the aqueous medium can be measured using a dynamic light scattering particle size distribution meter NANOTRAC UPA-EX150 (manufactured by Nikkiso Co., Ltd.).

Mixing Step

In the mixing step, a mixed solution is prepared by mixing the resin fine particle dispersion liquid with at least one of the release agent fine particle dispersion liquid and the colorant fine particle dispersion liquid as necessary. The mixed solution can be prepared by using a known mixing device such as a homogenizer or a mixer.

Step of Forming Aggregate Particles (Aggregation Step)

In the aggregation step, the fine particles contained in the mixed solution prepared in the mixing step are aggregated to form aggregates with a target particle diameter. Here, an aggregating agent is added thereto and mixed into the mixture, and the mixture is appropriately subjected to heating and mechanical power as necessary to form aggregates in which the resin fine particles and at least one of the release agent fine particles and the colorant fine particles are aggregated.

Examples of the aggregating agent include an organic aggregating agent such as a quaternary salt cationic surfactant or polyethyleneimine; an inorganic metal salt such as sodium sulfate, sodium nitrate, sodium chloride, calcium chloride, or calcium nitrate; an inorganic ammonium salt such as ammonium sulfate, ammonium chloride, or ammonium nitrate; and an inorganic aggregating agent such as a di- or higher valent metal complex. Further, an acid can also be added to the mixed solution so that the pH is decreased and the particles are softly aggregated, and sulfuric acid, nitric acid, or the like can be used as the acid.

The aggregating agent may be added to the mixed solution in any form of dry powder or an aqueous solution dissolved in an aqueous medium, but the aggregating agent can be added in the form of an aqueous solution in order to uniformly aggregate the particles. Further, the aggregating agent can be added to and mixed into the mixed solution at a temperature lower than or equal to the glass transition temperature or the melting point of the resin contained in the mixed solution. When the aggregating agent is mixed into the mixed solution under the above-described temperature conditions, relatively uniform aggregation proceeds. The aggregating agent can be mixed into the mixed solution using a known mixing device such as a homogenizer or a mixer. The aggregation step is a step of forming aggregates having a toner particle size in the aqueous medium. The volume average particle diameter of the aggregates produced in the aggregation step is, for example, in a range of 3 μm to 10 μm. The volume average particle diameter can be measured by a coulter method using a particle size distribution analyzer (COULTER Multisizer III: manufactured by Beckman Coulter, Inc.).

Shell formation step of further adding resin fine particles containing resin for shell to dispersion liquid containing aggregates and aggregating particles to form aggregates having shell A shell formation step of forming a shell by further adding resin fine particles containing a resin for a shell and aggregating the particles can be provided after the formation of aggregated particles (core particles) in the aggregation step. That is, the toner particles may include core particles containing a binder resin and a shell on the core particle surface. As the resin for a shell, the same resin as the binder resin may be used, or other resins may be used. The amount of the resin for a shell to be added is, for example, 5 parts by mass or greater and 40 parts by mass or less and, for example, 10 parts by mass or greater and 30 parts by mass or less with respect to 100 parts by mass of the binder resin contained in the core particles.

In this case, in order to allow the toner particles to easily contain boron, a boron compound can be added to the dispersion liquid containing the aggregates along with the resin fine particles containing the resin for a shell in the shell formation step.

The boron compound may be boric acid or a compound that can be changed to boric acid by controlling the pH in the production of the toner. Examples thereof include at least one selected from the group consisting of boric acid, borax, organic boric acid, a borate, boric acid ester, and the like. For example, the pH may be controlled by adding a boric acid source to the mixed solution so that the aggregates contain boric acid. The shell formation step can be performed by controlling the pH to be under an acidic condition in the aggregation step.

The boric acid may be present in the aggregates in the unsubstituted state. At least one selected from the group consisting of boric acid and borax is suitable as the boric acid source. In a case where the toner is produced in an aqueous medium, a borate can be added to the mixed solution as the boric acid source from the viewpoints of the reactivity and the production stability. Specifically, the boric acid source includes more suitably at least one selected from the group consisting of sodium tetraborate, borax, and ammonium borate and still more suitably borax.

Borax is represented by a sodium tetraborate decahydrate ($Na_2B_4O_7$), and changed to boric acid in an acidic aqueous solution, and thus borax can be used in a case of being used in an aqueous medium in an acidic environment. According to an addition method, borax may be added in any form of dry powder or an aqueous solution dissolved in an aqueous medium, but borax can be added in the form of an aqueous solution in order to uniformly aggregate the particles. The concentration of the aqueous solution may be appropriately changed depending on the concentration thereof to be contained in the toner, and is, for example, in a range of 1% to 20% by mass. The pH can be controlled to be in an acidic condition before, during, or after the addition of borax in order to change borax to boric acid. The pH may be controlled to be, for example, in a range of 1.5 to 5.0 and, for example, in a range of 2.0 to 4.0.

Step of Obtaining Dispersion Liquid Containing Toner Particles (Fusion Step)

In the fusion step, first, the aggregation is stopped while the dispersion liquid containing the aggregates obtained in the aggregation step is stirred in the same manner as in the aggregation step. The aggregation is stopped by adding an aggregation stopping agent such as a base, a chelate compound, or an inorganic salt compound such as sodium chloride, which can adjust the pH.

The dispersed state of the aggregated particles in the dispersion liquid is stabilized by the action of the aggregation stopping agent, the mixed solution is heated at a temperature higher than or equal to the glass transition temperature or the melting point of the resin to fuse the aggregated particles, and thus the particles having a desired particle diameter are prepared. Further, the 50% particle diameter (D50) based on volume distribution of the toner particles is, for example, in a range of 3 μm to 10 km.

Step of Obtaining Desired Surface Shape of Toner (Spheronization Step)

The spheronization step of further increasing the temperature and maintaining the temperature until the toner particles have a desired circularity or surface shape can be performed during or after the fusion step. The specific temperature of the spheronization step is, for example, 90° C. or higher, for example, 92° C. or higher, and for example, 95° C. or lower. The heating time in the spheronization step is, for example, 3 hours or longer, 5 hours or longer, or 8 hours or longer. In the present step, a hydrogen bond derived from boric acid is likely to be formed in the toner particles.

Cooling Step

The cooling step of decreasing the temperature of the dispersion liquid containing the obtained toner particles to a temperature lower than the crystallization temperature or the glass transition temperature of the resin and the crystalline resin component can be performed by controlling the cooling rate after the spheronization step. A change in the domain shape which is accompanied by the crystallization of the crystalline resin component can be suppressed by performing the cooling step. As a result, the proportion of the domain area of the crystalline resin component in the vicinity of the toner particle surface is likely to be controlled.

The specific cooling rate is 0.1° C./sec or greater, for example, 0.5° C./sec or greater, for example, 2° C./sec or greater, and for example, 4° C./sec or greater.

Annealing Step

An annealing step of heating the mixed solution at a temperature higher than or equal to the crystallization temperature or higher than or equal to the glass transition temperature of the resin or at a temperature lower than or equal to the crystallization temperature of a release agent in a case where the mixed solution contains a release agent and maintaining the temperature can be performed after the cooling step.

The crystalline resin component that is compatible with the resin of the toner particles is crystallized and a change in domain shape can be further suppressed by performing the annealing step.

Post-Treatment Step

In the method of producing the toner, post-treatment steps such as a washing step, a solid-liquid separation step, a drying step, and the like may be performed, and toner particles in a dried state can be obtained by performing the post-treatment steps.

External Addition Step

In the external addition step, silica fine particles are subjected to an external addition treatment to the toner particles obtained in the drying step.

The sticking state of the external additive and the coating state of the toner particles with the external additive can be arbitrarily controlled by adjusting the rotation speed (rpm) of the stirring blade provided in an external adder and the external addition time as external addition conditions.

It is effective to increase the rotation speed and the external addition time in order to more firmly stick the toner particles, and particularly the sticking strength can be further increased by increasing the rotation speed. Further, since external additive particles with a small particle diameter form aggregates, the toner particles are subjected to a coating treatment with an external additive while a disintegration treatment is carried out by controlling the external addition conditions. The disintegration properties can be enhanced by increasing the rotation speed and the external addition time, but it is effective to reduce the rotation speed and to increase the external addition time in order to further promote disintegration while suppressing the sticking strength.

Method of Measuring Each Physical Property

Next, a method of measuring each physical property according to the present disclosure will be described.

Measurement of weight-average particle diameter (D4) and number average particle diameter (D1) of toner or toner particles The weight-average particle diameter (D4) and the number average particle diameter (D1) of the toner or toner particles are measured by 25000 effective measuring channels using a precision particle size distribution measuring device "COULTER COUNTER Multisizer 3" (registered trademark, manufactured by Beckman Coulter, Inc.) provided with an aperture tube having a diameter of 100 μm by an aperture impedance method and dedicated software "BECKMAN COULTER Multisizer 3 Version 3.51" (manufactured by Beckman Coulter, Inc.) attached to the device and calculated by analyzing measurement data.

An electrolyte solution obtained by dissolving special grade sodium chloride in ion exchange water and adjusting the concentration thereof to about 1% by mass, for example, "ISOTON II" (manufactured by Beckman Coulter, Inc.) can be used as the electrolyte solution used for the measurement.

In addition, the dedicated software is set up in the following manner before the measurement and the analysis.

In the dedicated software "screen for changing standard measuring method (SOM)", the total count number in the control mode is set to 50000 particles, the number of times of measurement is set to once, and a value obtained by using "nominal particle 10.0 μm" (manufactured by Beckman Coulter, Inc.) is set as the Kd value. The threshold value and the noise level are automatically set by pressing the measurement button of the threshold value/noise level. Further, the current is set to 1600 μA, the gain is set to 2, the electrolyte solution is set to ISOTON II, and the aperture tube flash after measurement is checked.

In dedicated software "setting screen for converting pulse to particle diameter", the bin interval is set to the logarithmic particle diameter, the particle diameter bin is set to 256 particle diameter bin, and the particle diameter range is set to 2 μm or greater and 60 μm or less.

The specific measuring method is as follows.

(1) A 250 ml round-bottom glass beaker for exclusive use of Multisizer 3 is charged with about 200 ml of the electrolyte solution and set on a sample stand, and the solution is stirred with a stirrer rod at 24 rotations/sec in a counterclockwise direction. Further, the stain and air bubbles inside the aperture tube are removed by the dedicated software "aperture tube flash".

(2) A 100 ml flat-bottom glass beaker is charged with about 30 ml of the electrolyte solution, and about 0.3 ml of a diluent obtained by diluting "Contaminon N" (10 mass % aqueous solution of neutral detergent for washing precision measuring machine with pH of 7, which is formed of nonionic surfactant, anionic surfactant, and organic builder, manufactured by Wako Pure Chemical Industries, Ltd.) to 3 times by mass with ion exchange water is added thereto as a dispersant.

(3) A predetermined amount of ion exchange water is poured into a water tank of an ultrasonic disperser "Ultrasonic Dispersion System Tetoral 150" with an electrical output of 120 W, which is provided with two built-in oscillators having an oscillation frequency of 50 kHz in a state of a phase shift of 180 degrees, and about 2 ml of Contaminon N is added to the water tank.

(4) The beaker of the item (2) is set in a beaker fixing hole of the ultrasonic disperser, and the ultrasonic disperser is operated. Further, the position of the height of the beaker is adjusted such that the resonance state of the liquid level of the electrolyte solution in the beaker is maximized.

(5) The electrolyte solution in the beaker of the item (4) is irradiated with ultrasonic waves, and about 10 mg of the toner or the toner particles are added to the electrolyte solution little by little and dispersed therein. Further, an ultrasonic dispersion treatment is further continued for 60 seconds. In addition, the water temperature in the water tank is appropriately adjusted to 10° C. or higher and 40° C. or lower in the ultrasonic dispersion treatment.

(6) The electrolyte solution of the item (5) in which the toner or the toner particles have been dispersed using a pipette is added dropwise to the round-bottom beaker of the item (1) disposed in the sample stand, and the measurement concentration is adjusted to about 5%. Further, the measurement is performed until the number of measured particles reaches 50000.

(7) The weight-average particle diameter (D4) is calculated by analyzing the measurement data using the dedicated software attached to a device. Further, "average diameter" of the analysis/volume statistics (arithmetic average) screen is the weight-average particle diameter (D4) in a case where the graph/vol % is set with the dedicated software, and "average diameter" of "analysis/number statistics (arithmetic average)" screen is the number average particle diameter (D1) in a case where the graph/number % is set with the dedicated software.

Method of Measuring Amount of Elements in Toner

The fluorescent X-rays of each element are measured in conformity with JIS K 0119-1969, and the specific method thereof is as follows.

A wavelength dispersive X-ray fluorescence analyzer "Axios" (manufactured by PANalytical) is used as a measuring device, and dedicated software "SuperQ ver. 4.0F" (manufactured by PANalytical) attached to the device, which is used for setting the measurement conditions and analyzing the measurement data is used. Further, Rh is used as an anode of the X-ray tube, the measurement is performed in a vacuum atmosphere, the measurement diameter (collimator mask diameter) is set to 27 mm, and the measurement time is set to 10 seconds. Further, light elements are measured by performing detection with a proportional counter (PC), and heavy elements are measured by performing detection with a scintillation counter (SC).

A pellet having a thickness of about 2 mm and a diameter of about 39 mm, molded by pouring about 4 g of the toner into a dedicated aluminum ring for pressing, flattening the surface thereof and pressurizing the surface at 20 MPa for 60 seconds using a tablet compression molding machine "BRE-32" (manufactured by Maekawa Testing Machine MFG Co., Ltd.) is used as a measurement sample.

The measurement is performed under the above-described conditions, the elements are identified based on the obtained peak positions of X-rays, and the concentration thereof is calculated from the counting rate (unit: cps), which is the number of X-ray photons per unit time.

Quantification of $SiO_2$ in Toner

Silica ($SiO_2$) fine powder is added to and sufficiently mixed into the toner particles using a coffee mill such that the amount thereof reaches 0.10 parts by mass with respect to 100 parts by mass of toner particles. The silica fine powder is mixed into the toner particles such that the amounts thereof reach 0.20 parts by mass and 0.50 parts by mass in the same manner as described above, and these are used as samples for a calibration curve.

A pellet of each of the samples for a calibration curve is prepared in the same manner using a tablet compression molding machine, and the counting rate (unit: cps) of Si-Kα rays observed at a diffraction angle (2θ) of 109.08° when PET is used as a dispersive crystal is measured. In this case, the acceleration voltage and the current value of the X-ray generation device are respectively set to 24 kV and 100 mA. The linear function calibration curve is obtained such that the longitudinal axis represents the obtained counting rate of X-rays and the lateral axis represents the amount of $SiO_2$ to be added in each sample for a calibration curve.

Next, the toner to be analyzed is formed into pellets as described above using a tablet compression molding machine, and the counting rate of the Si-Kα rays is measured. Further, the content of $SiO_2$ in the toner is determined from the calibration curve described above.

Method of Measuring Aggregation Degree of Toner

The aggregation degree of the toner is measured in the following manner.

A measuring device obtained by connecting a digital display vibration meter "DIGI-VIBRO MODEL 1332A" (manufactured by Showasokki Co., Ltd.) to a side surface portion of a vibration table of "POWDER TESTER" (manufactured by Hosokawa Micron Corporation) is used as the measuring device. Further, a sieve having a mesh size of 25 μm (635 mesh), a sieve having a mesh size of 38 μm (390 mesh), and a sieve having a mesh size of 75 μm (200 mesh) are set in an overlapping manner in this order from the top. The measurement is performed in the following manner in an environment of 23° C. and 60% RH.

(1) The vibration amplitude of the vibration table is adjusted in advance such that the displacement value of the digital display vibration meter reaches 0.60 mm (peak-to-peak).

(2) 5 g of the toner which has been allowed to stand for 24 hours is precisely weighed in an environment of 23° C. and 60% RH and gently placed on the top sieve having a mesh size of 150 μm.

(3) The sieves are allowed to vibrate for 15 seconds, the mass of the toner remaining on each sieve is measured, and the aggregation degree is calculated based on the following equation.

Aggregation degree (%)={(mass (g) of sample on sieve with mesh size of 75 m)/5 (g)}×100+{(mass (g) of sample on sieve with mesh size of 38 m)/5 (g)}×100×0.6+{(mass (g) of sample on sieve with mesh size of 25 m)/5 (g)}×100×0.2

Calculation of Average Ratio as of Area in Domain of Crystalline Resin Component in Surface Layer Region to Depth of 200 nm from Surface of Toner Particle The cross sections of the toner particles are observed with a transmission electron microscope. As is calculated from the cross-sectional areas of the domains formed by the crystalline resin components, and the dispersed state of the crystalline resin components in the toner is evaluated based on the average value of arbitrarily selected 100 toner particles.

Specifically, the toner is embedded in a visible photocurable embedding resin (D-800, manufactured by Nisshin-EM), and cut to a thickness of 60 nm with an ultrasonic ultramicrotome (EM5, manufactured by Leica), and stained with Ru using a vacuum staining device (manufactured by Filgen, Inc.). Thereafter, cross sections are observed at an acceleration voltage of 120 kV using a transmission electron microscope (H7500, manufactured by Hitachi, Ltd.). The observation is performed by selecting 100 cross sections of the toner particles with a particle diameter of ±2.0 μm from the weight-average particle diameter and capturing images of the cross sections. The obtained images are processed using image processing software (Photoshop (registered trademark) 5.0, manufactured by Adobe) to clearly distinguish the domains of the crystalline resin component from the regions of the resin. Specifically, the domains of the crystalline resin component can be distinguished in the following manner. The captured TEM images are binarized by setting the threshold value of the brightness (tone: 255) to 160 using the image processing software. Here, the crystalline resin component of the toner and the photocurable resin D800 are bright areas, and regions other than the crystalline resin component of the toner are dark areas. The contour of the toner can be distinguished by the darkness and the brightness of the toner and the photocurable resin.

The cross section of the toner particle is subjected to masking except for a surface layer region up to a depth of 200 nm from the surface of the toner particle (contour of the cross section). Specifically, a line is drawn from the center of gravity of the cross section of the toner particle to a point on the contour of the cross section of the toner particle. A position on the line to 200 nm from the contour in the gravitational direction is specified. Further, this operation is performed for one circumference on the contour of the cross section of the toner particle, and the surface layer region up to 200 nm from the contour of the cross section of the toner particle is clearly shown. The percentage of the area occupied by the domain of the crystalline resin component in the area of the obtained surface layer region is calculated and defined as.

Method of Measuring Exposure Ratio Bs of Toner Particles

Hereinafter, the exposure ratio Bs of the toner particles is measured by the following procedures.

Measurement of Major Axis of External Additive

A reflected electron image and a secondary electron image of the external additive on the surface of the toner particle are captured at an acceleration voltage of 0.7 kV and an observation magnification of 50000 times using a scanning electron microscope Gemini 560 (trade name, manufactured by Carl Zeiss AG). Here, a visual field that does not include the contour of the toner is selected using the secondary electron image and an image thereof is captured.

The toner is fixed to a sample stage using carbon tape or the like and observed as it is.

The major axis of the external additive is measured by using the obtained reflected electron image, and the external additive with a major axis of 5 nm or greater is used as the external additive.

Further, the same procedure as described above can be performed on the toner containing a plurality of external additives on the surface of the toner particle. When the reflected electron image is observed with Gemini 560, elements of each fine particle can be specified by performing elemental analysis at an acceleration voltage of 10 kV using an energy dispersive X-ray spectroscopic detector. In a case where the acceleration voltage is high, the elements of each fine particle can be specified by depositing platinum on the toner surface in advance and performing elemental analysis when the toner is charged up.

Further, the same kind of fine particles can be selected based on the characteristics of the shape. The major axis of each kind of fine particles can be calculated by performing the above-described measurement on the same kind of fine particles.

Method of Measuring Coverage of External Additive and Exposure Ratio of Toner Particles The coverage of the external additive according to the present disclosure is measured by the observed image that has determined the major axis of the external additive. The coverage is calculated from the observed image in the following manner using image processing software "ImageJ".

Only the particles derived from the external additive are selected on the software by particle analysis. Next, the selection screen displays the area by performing the measurement setting. The coverage (% by area) of the external additive in the visual field is obtained by dividing this value by the area of the entire visual field. This measurement is performed on 100 visual fields, and the average value of the obtained values is defined as the coverage of the external additive. Further, "100−(coverage of external additive)" is defined as the exposure ratio (% by area) of the toner particles.

Method of Measuring Molecular Weight

The molecular weight distribution of THF soluble matter of the toner is measured in the following manner according to gel permeation chromatography (GPC).

First, the toner is dissolved in tetrahydrofuran (THF) at room temperature for 24 hours. Further, the obtained solution is filtered through a solvent-resistant membrane filter "MYSHORIDISC" (manufactured by Tosoh Corporation) having a pore size of 0.2 μm to obtain a sample solution. Further, the sample solution is prepared such that the concentration of the component soluble in THF is about 0.8% by mass. The measurement is performed using this sample solution under the following conditions.

Device: HLC8320 GPC (detector: RI) (manufactured by Tosoh Corporation)

Column: two units of Shodex LF-404 (manufactured by Showa Denko K.K.)

Eluent: tetrahydrofuran (THF)

Flow rate: 1.0 ml/min

Oven temperature: 40.0° C.

Sample injection volume: 0.10 ml

The molecular weight of the sample is calculated by using a molecular weight calibration curve prepared with a standard polystyrene resin (for example, trade name "EasiVial PS-H Polystyrene", manufactured by Agilent Technologies Japan, Ltd.).

Measurement of Acid Value

The acid value is the number of milligrams of potassium hydroxide required to neutralize the acid contained in 1 g of the sample.

The acid value of the resin is measured in conformity with JIS K 0070-1992, and specifically, the acid value is measured by the following procedures.

(1) Preparation of Reagent 1.0 g of phenolphthalein is dissolved in 90 ml of ethyl alcohol (95% by volume), and ion exchange water is added thereto to adjust the amount of the solution to 100 ml, thereby obtaining a phenolphthalein solution.

7 g of special grade potassium hydroxide is dissolved in 5 ml of water, and ethyl alcohol (95% by volume) is added thereto to adjust the amount of the solution to 11. The solution is poured to an alkali-resistant container such that contact with carbon dioxide or the like is avoided, and the resulting solution is allowed to stand for 3 days and filtered, thereby obtaining a potassium hydroxide solution. The obtained potassium hydroxide solution is stored in an alkali-resistant container. The factor of the potassium hydroxide solution is determined by placing 25 ml of 0.1 mol/l hydrochloric acid in an Erlenmeyer flask, adding several drops of the phenolphthalein solution thereto, performing titration with the potassium hydroxide solution, and calculating the amount of the potassium hydroxide solution required for neutralization. The 0.1 mol/l hydrochloric acid is prepared in conformity with JIS K 8001-1998 and used.

(2) Operation (A) Present Test 2.0 g of a sample of a pulverized resin is precisely weighed in a 200 ml Erlenmeyer flask, and 100 ml of a mixed solution of toluene and ethanol (2:1) is added thereto to be dissolved therein for 5 hours. Next, several drops of the phenolphthalein solution are added thereto as an indicator, and the solution is titrated using the potassium hydroxide solution. Further, the time point when the light red color of the indicator continues for about 30 seconds is determined as the end point of the titration.

(B) Blank Test

The titration is performed in the same manner as in the above-described operation except that the sample is not used (that is, only the mixed solution of toluene/ethanol (2:1) is used).

(3) The Acid Value is Calculated by Substituting the Obtained Results into the Following Equation.

$$A=[(C-B)\times f\times 5.61]/S$$

Here, A represents the acid value (mgKOH/g), B represents the amount (ml) of the potassium hydroxide solution to be added in the blank test, C represents the amount (ml) of the potassium hydroxide solution to be added in the present test, f represents the factor of the potassium hydroxide solution, and S represents the sample (g).

Method of Quantifying Boron Atoms Contained in Toner Particles

The content of the boron (B) atoms in the toner particles is quantified by an inductively coupled plasma atomic emission spectrometer (ICP-AES (manufactured by Seiko Instruments Inc.)). As the pretreatment, 100.0 mg of the toner particles are subjected to acid decomposition by using 8.00 ml of 60% nitric acid (for atomic absorption spectrometry, manufactured by KANTO CHEMICAL CO., INC.).

Method of Removing External Additive from Toner to Obtain Toner Particles 160 g of sucrose (manufactured by Kishida Chemical Co., Ltd.) is added to 100 mL of ion exchange water and dissolved in a hot water bath, thereby preparing a concentrated sucrose solution. 31 g of the concentrated sucrose solution and 6 mL of Contaminon N (10 mass % aqueous solution of neutral detergent for washing precision measuring machine with pH of 7, which is formed of nonionic surfactant, anionic surfactant, and organic builder, manufactured by Wako Pure Chemical Industries, Ltd.) are poured into a centrifuge tube (volume of 50 ml). 1.0 g of the toner is added thereto, and the toner clumps are broken up with a spatula or the like. The centrifuge tube is shaken in a shaker (AS-1N, sold by AS ONE CORPORATION) at 300 spm (strokes per min) for 20 minutes.

After the centrifuge tube is shaken, the solution is transferred to a glass tube (50 mL) for a swing rotor and separated by a centrifuge (H-9R, manufactured by KOKUSAN Co., Ltd.) at 3500 rpm for 30 minutes.

The toner particles and the external additive are separated from each other by performing this operation. The toner particles separated into the uppermost layer are collected by a spatula or the like after visual confirming that the toner particles are sufficiently separated from the aqueous solution. The collected toner particles are filtered through a vacuum filter and dried by a dryer for 1 hour or longer, thereby obtaining a sample for measurement. This operation is performed a plurality of times to ensure the required amount.

EXAMPLES

Hereinafter, the present disclosure will be described in more detail with reference to examples and comparative examples. The present disclosure is not limited to the following examples unless the gist thereof is overstepped. In the description of the following examples, "parts" are on a mass basis unless otherwise specified.

Synthesis of Polyester Resin 1

Bisphenol A-ethylene oxide 2-mole adduct: 48 parts by mole

Bisphenol A-propylene oxide 2-mole adduct: 48 parts by mole

Terephthalic acid: 65 parts by mole

Dodecenylsuccinic acid: 30 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred.

0.7 parts of tin distearate was added thereto with respect to 100 parts of these monomers. The temperature was increased from 195° C. to 240° C. over 5 hours while water which was further generated was distilled off, and a dehydration condensation reaction was further carried out at 240° C. for 2 hours. Next, the temperature was decreased to 190° C., 5 parts by mole of trimellitic anhydride was gradually added thereto, and the reaction was continued at 190° C. for 1 hour.

As a result, an amorphous polyester resin 1 having a glass transition temperature of 55.2° C., an acid value of 14.3 mgKOH/g, a hydroxyl value of 24.1 mgKOH/g, a weight-average molecular weight of 43600, and a number average molecular weight of 6200 was obtained.

Synthesis of Polyester Resin 2

Bisphenol A-ethylene oxide 2-mole adduct: 48 parts by mole

Bisphenol A-propylene oxide 2-mole adduct: 48 parts by mole

Terephthalic acid: 65 parts by mole

Dodecenylsuccinic acid: 30 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred.

0.7 parts of tin distearate was added thereto with respect to 100 parts of these monomers. The temperature was increased from 195° C. to 240° C. over 5 hours while water which was further generated was distilled off, and a dehydration condensation reaction was further carried out at 240° C. for 2 hours. Next, the temperature was decreased to 190° C., 5 parts by mole of trimellitic anhydride was gradually added thereto, and the reaction was continued at 190° C. for 4 hour.

As a result, an amorphous polyester resin 2 having a glass transition temperature of 56.2° C., an acid value of 10.0 mgKOH/g, a hydroxyl value of 20.1 mgKOH/g, a weight-average molecular weight of 74800, and a number average molecular weight of 10200 was obtained.

Synthesis of Polyester Resin 3

Bisphenol A-ethylene oxide 2-mole adduct: 48 parts by mole

Bisphenol A-propylene oxide 2-mole adduct: 48 parts by mole

Terephthalic acid: 65 parts by mole

Dodecenylsuccinic acid: 30 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred.

0.7 parts of tin distearate was added thereto with respect to 100 parts of these monomers. The temperature was increased from 195° C. to 240° C. over 5 hours while water which was further generated was distilled off, and a dehydration condensation reaction was further carried out at 240° C. for 2 hours. Next, the temperature was decreased to 190° C., 5 parts by mole of trimellitic anhydride was gradually added thereto, and the reaction was continued at 190° C. for 6 hours.

As a result, an amorphous polyester resin 3 having a glass transition temperature of 57.2° C., an acid value of 9.0 mgKOH/g, a hydroxyl value of 18.1 mgKOH/g, a weight-average molecular weight of 81000, and a number average molecular weight of 13200 was obtained.

Synthesis of Polyester Resin 4

Bisphenol A-ethylene oxide 2-mole adduct: 48 parts by mole

Bisphenol A-propylene oxide 2-mole adduct: 48 parts by mole

Terephthalic acid: 65 parts by mole

Dodecenylsuccinic acid: 30 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred.

0.7 parts of tin distearate was added thereto with respect to 100 parts of these monomers. The temperature was increased from 195° C. to 240° C. over 5 hours while water which was further generated was distilled off, and a dehydration condensation reaction was further carried out at 240° C. for 2 hours. Next, the temperature was decreased to 190° C., 8 parts by mole of trimellitic anhydride was gradually added thereto, and the reaction was continued at 190° C. for 1 hour.

As a result, an amorphous polyester resin 4 having a glass transition temperature of 58.5° C., an acid value of 30.0 mgKOH/g, a hydroxyl value of 18.1 mgKOH/g, a weight-average molecular weight of 38000, and a number average molecular weight of 9200 was obtained.

Synthesis of Polyester Resin 5

Bisphenol A-ethylene oxide 2-mole adduct: 48 parts by mole

Bisphenol A-propylene oxide 2-mole adduct: 48 parts by mole

Terephthalic acid: 65 parts by mole

Dodecenylsuccinic acid: 30 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred.

0.7 parts of tin distearate was added thereto with respect to 100 parts of these monomers. The temperature was increased from 195° C. to 240° C. over 5 hours while water which was further generated was distilled off, and a dehydration condensation reaction was further carried out at 240° C. for 2 hours. Next, the temperature was decreased to 190° C., 10 parts by mole of trimellitic anhydride was gradually added thereto, and the reaction was continued at 190° C. for 1 hour.

As a result, an amorphous polyester resin 5 having a glass transition temperature of 58.5° C., an acid value of 34.0 mgKOH/g, a hydroxyl value of 16.1 mgKOH/g, a weight-average molecular weight of 36000, and a number average molecular weight of 8700 was obtained.

Synthesis of Polyester Resin 6

Bisphenol A-ethylene oxide 2-mole adduct: 9 parts by mole

Bisphenol A-propylene oxide 2-mole adduct: 95 parts by mole

Terephthalic acid: 50 parts by mole

Fumaric acid: 30 parts by mole

Dodecenylsuccinic acid: 25 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred. 1.0 parts of tin distearate was added thereto with respect to 100 parts of these monomers. The temperature was increased from 195° C. to 250° C. over 5 hours while water which was further generated was distilled off, and a dehydration condensation reaction was further carried out at 250° C. for 4 hours.

As a result, an amorphous polyester resin 6 having a glass transition temperature of 61.5° C., an acid value of 16.0 mgKOH/g, a hydroxyl value of 25.2 mgKOH/g, a weight-average molecular weight of 25200, and a number average molecular weight of 6100 was obtained.

Synthesis of Polyester Resin 7

Bisphenol A-ethylene oxide 2-mole adduct: 9 parts by mole

Bisphenol A-propylene oxide 2-mole adduct: 95 parts by mole

Terephthalic acid: 50 parts by mole

Fumaric acid: 30 parts by mole

Dodecenylsuccinic acid: 25 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred. 1.0 parts of tin distearate was added thereto with respect to 100 parts of these monomers. The temperature was increased from 195° C. to 250° C. over 5 hours while water which was further generated was distilled off, and a dehydration condensation reaction was further carried out at 250° C. for 2 hours.

As a result, an amorphous polyester resin 7 having a glass transition temperature of 60.2° C., an acid value of 19.8 mgKOH/g, a hydroxyl value of 28.2 mgKOH/g, a weight-average molecular weight of 11200, and a number average molecular weight of 4100 was obtained.

Preparation of Resin Particle Dispersion Liquid 1

Polyester resin 1: 100 parts

Methyl ethyl ketone: 50 parts

Isopropyl alcohol: 20 parts

The methyl ethyl ketone and the isopropyl alcohol were added to a container. Thereafter, the polyester resin 1 was gradually added thereto, the mixture was stirred for complete dissolution, thereby obtaining a polyester resin 1-dissolved solution. The temperature of the container containing the polyester resin 1-dissolved solution was set to 65° C., a 10% ammonia aqueous solution was gradually added dropwise to the container so that the total amount of the solution reached 5 parts while the mixture was stirred, and 230 parts of ion exchange water was further gradually added dropwise thereto at a rate of 10 ml/min to cause phase inversion emulsification. Further, desolvation was performed under reduced pressure using an evaporator, thereby obtaining a resin particle dispersion liquid 1 of the polyester resin 1. The particle diameter of the resin particle dispersion liquid 1 was measured using a particle size measuring device (LA-950, manufactured by Horiba, Ltd.), the volume average particle diameter of the resin particle dispersion liquid 1 was 135 nm. Further, the solid content of the resin particles was adjusted to 20% with ion exchange water.

Preparation of Resin Particle Dispersion Liquids 2 to 7

Resin particle dispersion liquids 2 to 7 were obtained in the same manner as described above except that the polyester resins 2 to 7 were used in place of the polyester resin 1 in the preparation of the resin particle dispersion liquid 1. The obtained resin particle dispersion liquids are listed in Table 1.

TABLE 1

| Resin particle dispersion liquid | Polyester resin | Number average particle diameter (nm) |
|---|---|---|
| Resin particle dispersion liquid 1 | Polyester resin 1 | 135 |
| Resin particle dispersion liquid 2 | Polyester resin 2 | 140 |
| Resin particle dispersion liquid 3 | Polyester resin 3 | 145 |
| Resin particle dispersion liquid 4 | Polyester resin 4 | 135 |
| Resin particle dispersion liquid 5 | Polyester resin 5 | 130 |
| Resin particle dispersion liquid 6 | Polyester resin 6 | 130 |
| Resin particle dispersion liquid 7 | Polyester resin 7 | 135 |

Preparation of Colorant Particle Dispersion Liquid

Copper phthalocyanine (Pigment Blue 15:3): 45 parts

Anionic surfactant NEOGEN RK (manufactured by DKS Co., Ltd.): 5 parts

Ion exchange water: 190 parts

An aqueous dispersion liquid (colorant fine particle dispersion liquid) in which the concentration of colorant fine particles was 20% was prepared by mixing the above-described components, dispersing the components using a high-pressure impact type disperser NANOMIZER (manufactured by YOSHIDA KIKAI CO., LTD.) for about 1 hour, and dispersing the colorant.

Preparation of Release Agent Particle Dispersion Liquid 1

Release agent (HNP-51, manufactured by NIPPON SEIRO CO., LTD., melting point of 78° C.): 45 parts Anionic surfactant NEOGEN RK (manufactured by DKS Co., Ltd.): 5 parts Ion exchange water: 190 parts A mixing container equipped with a stirring device was charged with the above-described components, and the mixture was heated to 90° C., circulated through CLEARMIX W-MOTION (manufactured by M Technique Co., Ltd.), and subjected to a dispersion treatment for 60 minutes. The dispersion treatment was performed under the following conditions.

Rotor outer diameter: 3 cm

Clearance: 0.3 mm

Rotor rotation speed: 19000 r/min

Screen rotation speed: 19000 r/min

The mixture was cooled to 40° C. under cooling treatment conditions of a rotor rotation speed of 1000 r/min, a screen rotation speed of 0 r/min, and a cooling rate of 10° C./min after the dispersion treatment, thereby obtaining a release agent particle dispersion liquid having a volume average particle diameter of 160 nm and a solid content of 20%.

Preparation of Release Agent Particle Dispersion Liquid 2

Release agent (behenyl behenate, melting point of 74° C.): 45 parts

Anionic surfactant NEOGEN RK (manufactured by DKS Co., Ltd.): 5 parts

Ion exchange water: 190 parts

A mixing container equipped with a stirring device was charged with the above-described components, and the mixture was heated to 90° C., circulated through CLEARMIX W-MOTION (manufactured by M Technique Co., Ltd.), and subjected to a dispersion treatment for 60 minutes. The dispersion treatment was performed under the following conditions.

Rotor outer diameter: 3 cm

Clearance: 0.3 mm

Rotor rotation speed: 19000 r/min

Screen rotation speed: 19000 r/min

The mixture was cooled to 40° C. under cooling treatment conditions of a rotor rotation speed of 1000 r/min, a screen rotation speed of 0 r/min, and a cooling rate of 10° C./min after the dispersion treatment, thereby obtaining a release agent particle dispersion liquid having a volume average particle diameter of 170 nm and a solid content of 20%.

Production of Toner Particles 1

Resin particle dispersion liquid 1: 700 parts

Colorant particle dispersion liquid 1: 80 parts

Release agent particle dispersion liquid 1: 30 parts

Release agent particle dispersion liquid 2: 90 parts

Ion exchange water: 1000 parts

First, the above-described materials were added to a round stainless steel flask and mixed in a core formation step. Next, the mixture was dispersed using a homogenizer ULTRA-TURRAX T50 (manufactured by IKA) at 5000 r/min for 10 minutes. A 1.0% nitric acid aqueous solution was added thereto to adjust the pH to 3.0, and the mixed solution was heated to 45° C. while the rotation speed at which the mixed solution was stirred in a heating water bath using a stirring blade was appropriately adjusted.

The volume average particle diameter of the formed aggregated particles was appropriately confirmed by using COULTER Multisizer III, and in a case where aggregated particles (cores) having a diameter of 5.0 μm were formed, the following materials were added thereto in a shell formation step and further stirred for 1 hour, thereby forming a shell.

Resin particle dispersion liquid 1: 300 parts

Ion exchange water: 300 parts 2.0 mass % borax aqueous solution: 50 parts Borax: manufactured by Wako Pure Chemical Industries, Ltd., sodium tetraborate decahydrate Thereafter, the pH of the mixture was adjusted to 9.0 by using a 5% sodium hydroxide aqueous solution, continuously stirred, and heated to 90° C. in the spheronization step.

Thereafter, the average circularity of the formed aggregated particles was appropriately measured by a flow type particle image analyzer "FPIA-3000" (manufactured by Sysmex Corporation).

The aggregated particles were heated (the heating time was 3 hours) until the average circularity thereof reached 0.970. Next, the particles were cooled to 25° C. by quickly adding ice thereto in the cooling step such that the cooling rate was set to 10° C./sec or greater, thereby obtaining a toner particle dispersion liquid 1.

Production of Toner Particles 2 to 14

Toner particles 2 to 14 were obtained in the same manner as described above except that the conditions were changed as listed in Table 2 in the production of the toner particles 1.

TABLE 2

| | Core formation step | | | Shell formation step | | | |
|---|---|---|---|---|---|---|---|
| | | | | | | Borax | Magnesium sulfate |
| | In core formation | Parts | Core particle diameter | In shell formation | Parts | aqueous solution (parts) | aqueous solution (parts) |
| Toner particles 1 | Resin particle dispersion liquid 1 | 700 | 5.0 | Resin particle dispersion liquid 1 | 300 | 50 | 0 |
| Toner particles 2 | Resin particle dispersion liquid 1 | 900 | 5.7 | Resin particle dispersion liquid 1 | 100 | 50 | 0 |
| Toner particles 3 | Resin particle dispersion liquid 1 | 950 | 6.0 | Resin particle dispersion liquid 1 | 50 | 50 | 0 |
| Toner particles 4 | Resin particle dispersion liquid 1 | 700 | 5.0 | Resin particle dispersion liquid 1 | 300 | 200 | 0 |
| Toner particles 5 | Resin particle dispersion liquid 1 | 700 | 5.0 | Resin particle dispersion liquid 1 | 300 | 5 | 0 |
| Toner particles 6 | Resin particle dispersion liquid 1 | 700 | 5.0 | Resin particle dispersion liquid 1 | 300 | 0 | 50 |
| Toner particles 7 | Resin particle dispersion liquid 1 | 700 | 5.0 | Resin particle dispersion liquid 1 | 300 | 300 | 0 |
| Toner particles 8 | Resin particle dispersion liquid 1 | 600 | 5.0 | Resin particle dispersion liquid 1 | 400 | 50 | 0 |
| Toner particles 9 | Resin particle dispersion liquid 2 | 700 | 5.0 | Resin particle dispersion liquid 2 | 300 | 50 | 0 |
| Toner particles 10 | Resin particle dispersion liquid 3 | 700 | 5.0 | Resin particle dispersion liquid 3 | 300 | 50 | 0 |
| Toner particles 11 | Resin particle dispersion liquid 4 | 700 | 5.0 | Resin particle dispersion liquid 4 | 300 | 50 | 0 |
| Toner particles 12 | Resin particle dispersion liquid 5 | 700 | 5.0 | Resin particle dispersion liquid 5 | 300 | 50 | 0 |
| Toner particles 13 | Resin particle dispersion liquid 6 | 700 | 5.0 | Resin particle dispersion liquid 6 | 300 | 50 | 0 |
| Toner particles 14 | Resin particle dispersion liquid 7 | 700 | 5.0 | Resin particle dispersion liquid 7 | 300 | 50 | 0 |

Silica Fine Particles

The following silica fine particles were prepared as the external additives that were externally added to the toner particles.

Silica fine particles 1: RX50 (manufactured by NIPPON ΔEROSIL CO., LTD.)

Silica fine particles 2: TGC191 (manufactured by Cabot Corporation)

Silica fine particles 3: RX200 (manufactured by NIPPON ΔEROSIL CO., LTD.)

Production Example of toner 1

Toner particles 1: 100.0 parts

Silica fine particles 1: 2.2 parts

Silica fine particles 3: 1.0 parts

The above-described materials were mixed at 3000 rpm for 7.5 minutes using a Henschel mixer FM10C (manufactured by NIPPON COKE & ENGINEERING CO., LTD.), thereby obtaining a toner 1. The external addition conditions for the toner 1 are listed in Table 3. Further, the results obtained by performing various analysis on the toner 1 are listed in Tables 4-1 and 4-2.

Production Examples of Toners 2 to 22 and Comparative Toners 1 to 5

Toners 2 to 22 and comparative toners 1 to 5 were obtained in the same manner as described above except that the conditions were changed as listed in Table 3 in the production example for the toner 1. The results obtained by performing various analysis described above on these toners are listed in Table 4.

TABLE 3

| | | External additive | | | | External addition conditions | |
|---|---|---|---|---|---|---|---|
| | Toner particles | Name | Addition amount (parts) | Name | Addition amount (parts) | Rotation speed | Time |
| Toner 1 | Toner particles 1 | RX50 | 2.2 | RX200 | 1.0 | 3000 | 7.5 |
| Toner 2 | Toner particles 2 | RX50 | 2.2 | RX200 | 1.0 | 3000 | 7.5 |
| Toner 3 | Toner particles 4 | RX50 | 2.2 | RX200 | 1.0 | 3000 | 7.5 |
| Toner 4 | Toner particles 5 | RX50 | 2.2 | RX200 | 1.0 | 3000 | 7.5 |
| Toner 5 | Toner particles 6 | RX50 | 2.2 | RX200 | 1.0 | 3000 | 7.5 |
| Toner 6 | Toner particles 7 | RX50 | 2.2 | RX200 | 1.0 | 3000 | 7.5 |

TABLE 3-continued

| | Toner particles | External additive Name | Addition amount (parts) | Name | Addition amount (parts) | External addition conditions Rotation speed | Time |
|---|---|---|---|---|---|---|---|
| Toner 7 | Toner particles 8 | RX50 | 2.2 | RX200 | 1.0 | 3000 | 7.5 |
| Toner 8 | Toner particles 9 | RX50 | 2.2 | RX200 | 1.0 | 3000 | 7.5 |
| Toner 9 | Toner particles 10 | RX50 | 2.2 | RX200 | 1.0 | 3000 | 7.5 |
| Toner 10 | Toner particles 11 | RX50 | 2.2 | RX200 | 1.0 | 3000 | 7.5 |
| Toner 11 | Toner particles 12 | RX50 | 2.2 | RX200 | 1.0 | 3000 | 7.5 |
| Toner 12 | Toner particles 13 | RX50 | 2.2 | RX200 | 1.0 | 3000 | 7.5 |
| Toner 13 | Toner particles 14 | RX50 | 2.2 | RX200 | 1.0 | 3000 | 7.5 |
| Toner 14 | Toner particles 1 | RX50 | 0.9 | RX200 | 0.7 | 4800 | 5.0 |
| Toner 15 | Toner particles 1 | RX50 | 1.1 | RX200 | 0.5 | 4800 | 5.0 |
| Toner 16 | Toner particles 1 | RX50 | 2.8 | RX200 | 1.0 | 4800 | 5.0 |
| Toner 17 | Toner particles 1 | RX50 | 2.8 | RX200 | 1.0 | 4800 | 7.5 |
| Toner 18 | Toner particles 1 | RX50 | 2.8 | RX200 | 1.0 | 4800 | 10.0 |
| Toner 19 | Toner particles 1 | TGC191 | 1.5 | RX200 | 0.1 | 3000 | 7.5 |
| Toner 20 | Toner particles 1 | TGC191 | 2.2 | RX200 | 1.0 | 4800 | 5.0 |
| Toner 21 | Toner particles 1 | TGC191 | 3.0 | RX200 | 0.5 | 3600 | 15.0 |
| Toner 22 | Toner particles 1 | TGC191 | 4.5 | RX200 | 0.5 | 3000 | 7.5 |
| Comparative toner 1 | Toner particles 1 | TGC191 | 1.3 | RX200 | 0.1 | 3000 | 10.0 |
| Comparative toner 2 | Toner particles 1 | TGC191 | 1.6 | — | — | 3000 | 10.0 |
| Comparative toner 3 | Toner particles 1 | TGC191 | 3.5 | RX200 | 1.0 | 4800 | 15.0 |
| Comparative toner 4 | Toner particles 1 | TGC191 | 5.0 | RX200 | 0.5 | 3000 | 7.5 |
| Comparative toner 5 | Toner particles 3 | RX50 | 3.0 | RX200 | 1.0 | 3000 | 7.5 |

TABLE 4-1

| | Toner particles | Toner analysis value: Content of silica fine particles (mass %) | Aggregation degree (%) | Exposure ratio Bs (area %) |
|---|---|---|---|---|
| Toner 1 | Toner particles 1 | 3.1 | 92.4 | 63.7 |
| Toner 2 | Toner particles 2 | 3.1 | 94.5 | 64.8 |
| Toner 3 | Toner particles 4 | 3.1 | 91.5 | 62.5 |
| Toner 4 | Toner particles 5 | 3.1 | 91.8 | 64.3 |
| Toner 5 | Toner particles 6 | 3.1 | 93.2 | 63.8 |
| Toner 6 | Toner particles 7 | 3.1 | 93.9 | 64.2 |
| Toner 7 | Toner particles 8 | 3.1 | 88.5 | 64.3 |
| Toner 8 | Toner particles 9 | 3.1 | 88.5 | 64.3 |
| Toner 9 | Toner particles 10 | 3.1 | 80.7 | 64.2 |
| Toner 10 | Toner particles 11 | 3.1 | 93.5 | 64.5 |
| Toner 11 | Toner particles 12 | 3.1 | 96.5 | 64.3 |
| Toner 12 | Toner particles 13 | 3.1 | 94.5 | 64.3 |
| Toner 13 | Toner particles 14 | 3.1 | 96.5 | 64.5 |
| Toner 14 | Toner particles 1 | 1.6 | 97.0 | 80.7 |
| Toner 15 | Toner particles 1 | 1.6 | 96.5 | 81.6 |
| Toner 16 | Toner particles 1 | 3.6 | 89.9 | 60.4 |

TABLE 4-1-continued

| | Toner particles | Toner analysis value: Content of silica fine particles (mass %) | Aggregation degree (%) | Exposure ratio Bs (area %) |
|---|---|---|---|---|
| Toner 17 | Toner particles 1 | 3.6 | 84.5 | 53.4 |
| Toner 18 | Toner particles 1 | 3.6 | 76.5 | 46.6 |
| Toner 19 | Toner particles 1 | 1.6 | 94.5 | 75.0 |
| Toner 20 | Toner particles 1 | 3.1 | 91.5 | 69.7 |
| Toner 21 | Toner particles 1 | 3.3 | 77.0 | 53.6 |
| Toner 22 | Toner particles 1 | 4.7 | 81.2 | 56.0 |
| Comparative toner 1 | Toner particles 1 | 1.4 | 98.3 | 88.0 |
| Comparative toner 2 | Toner particles 1 | 1.6 | 99.3 | 86.5 |
| Comparative toner 3 | Toner particles 1 | 4.3 | 68.8 | 48.9 |
| Comparative toner 4 | Toner particles 1 | 5.2 | 71.5 | 50.5 |
| Comparative toner 5 | Toner particles 3 | 3.1 | 97.7 | 64.5 |

TABLE 4-2

| | Toner particles | Toner particle analysis value: Toner particle diameter (μm) | Average area ratio As of crystalline resin component in the vicinity of toner particle surface (area %) | Weight-average molecular weight of polyester resin | Acid value of polyester resin (mgKOH/g) | Borax (ppm by mass) |
|---|---|---|---|---|---|---|
| Toner 1 | Toner particles 1 | 6.7 | 0.1 | 43600 | 14.3 | 5.0 |
| Toner 2 | Toner particles 2 | 6.7 | 0.9 | 43600 | 14.3 | 5.0 |
| Toner 3 | Toner particles 4 | 6.7 | 0.1 | 43600 | 14.3 | 98.0 |
| Toner 4 | Toner particles 5 | 6.7 | 0.1 | 43600 | 14.3 | 1.0 |
| Toner 5 | Toner particles 6 | 6.7 | 0.3 | 43600 | 14.3 | 0.0 |
| Toner 6 | Toner particles 7 | 6.7 | 0.1 | 43600 | 14.3 | 178.0 |
| Toner 7 | Toner particles 8 | 6.7 | 0.0 | 43600 | 14.3 | 5.0 |
| Toner 8 | Toner particles 9 | 6.7 | 0.1 | 74800 | 10.0 | 5.0 |
| Toner 9 | Toner particles 10 | 6.7 | 0.1 | 81000 | 9.0 | 5.0 |
| Toner 10 | Toner particles 11 | 6.7 | 0.1 | 38000 | 30.0 | 5.0 |
| Toner 11 | Toner particles 12 | 6.7 | 0.1 | 36000 | 34.0 | 5.0 |
| Toner 12 | Toner particles 13 | 6.7 | 0.1 | 25200 | 16.0 | 5.0 |
| Toner 13 | Toner particles 14 | 6.7 | 0.1 | 11200 | 19.8 | 5.0 |
| Toner 14 | Toner particles 1 | 6.7 | 0.1 | 43600 | 14.3 | 5.0 |
| Toner 15 | Toner particles 1 | 6.7 | 0.1 | 43600 | 14.3 | 5.0 |
| Toner 16 | Toner particles 1 | 6.7 | 0.1 | 43600 | 14.3 | 5.0 |
| Toner 17 | Toner particles 1 | 6.7 | 0.1 | 43600 | 14.3 | 5.0 |
| Toner 18 | Toner particles 1 | 6.7 | 0.1 | 43600 | 14.3 | 5.0 |
| Toner 19 | Toner particles 1 | 6.7 | 0.1 | 43600 | 14.3 | 5.0 |
| Toner 20 | Toner particles 1 | 6.7 | 0.1 | 43600 | 14.3 | 5.0 |
| Toner 21 | Toner particles 1 | 6.7 | 0.1 | 43600 | 14.3 | 5.0 |
| Toner 22 | Toner particles 1 | 6.7 | 0.1 | 43600 | 14.3 | 5.0 |
| Comparative toner 1 | Toner particles 1 | 6.7 | 0.1 | 43600 | 14.3 | 5.0 |
| Comparative toner 2 | Toner particles 1 | 6.7 | 0.1 | 43600 | 14.3 | 5.0 |
| Comparative toner 3 | Toner particles 1 | 6.7 | 0.1 | 43600 | 14.3 | 5.0 |
| Comparative toner 4 | Toner particles 1 | 6.7 | 0.1 | 43600 | 14.3 | 5.0 |
| Comparative toner 5 | Toner particles 3 | 6.7 | 2.0 | 43600 | 14.3 | 5.0 |

Example 1

Color Laser Jet Enterprise 6701dn (manufactured by HP) was prepared as an evaluation machine and modified such that the printing speed thereof was changeable. Further, a process cartridge (the movement direction of the surface of the developing roller was opposite to the movement direction of the surface of the toner supplying roller) of the present disclosure which was mountable on the above-described evaluation machine and set to have a peripheral speed ratio R of 1.2 was prepared and filled with 200 g of the toner 1, a durability test was performed by continuously feeding (printing) 15000 sheets of paper of horizontal lines with an image ratio of 1% at a printing speed of 75 sheets/min in a high-temperature and high-humidity environment (at a temperature of 30° C. and a humidity of 80% RH), and the density, the density stability, and the fogging were evaluated. The evaluation results are listed in Table 5.

Density Evaluation and Density Stability Evaluation

The density evaluation and the density stability evaluation were performed by outputting a solid black image after the durability test. The average value of the densities of the solid black image at three points of a left portion, a central portion, and a right portion in a printed area was measured for each of an upper portion of a transfer material and a lower portion of the transfer material in the solid black image. Further, the image density stability was evaluated based on a difference in average value between the image densities of the upper portion and the lower portion. Further, A4 size GF-C081 (manufactured by Canon Inc., 81.4 g/cm$^2$) was used as the transfer material, and the density was measured by using X-rite exact advance (manufactured by X-rite, Inc.).

The evaluation criteria are as follows.

Determination Criteria for Density Evaluation

The density was excellent in a case where the average value of the image densities was 1.20 or greater in both the upper portion and the lower portion of the printed area of the transfer material.

The density was problematic in a case where the average value of the image densities was less than 1.20 in both the upper portion and the lower portion of the printed area of the transfer material.

Determination Criteria for Density Stability Evaluation

The density stability was excellent in a case where the difference in the average value between the upper portion and the lower portion of the transfer material was less than 0.20.

The density stability was problematic in a case where the difference in the average value between the upper portion and the lower portion of the transfer material was 0.20 or greater.

Fogging Evaluation

The fogging was measured by using REFLECTOMETER MODEL TC-6DS (manufactured by Tokyo Denshoku Co., Ltd.). A green filter was used as the filter. A drum (electrostatic latent image carrying member) when a solid white image was output was taped with Mylar tape, the fogging was calculated by subtracting the reflectivity of the Mylar tape attached onto paper from the Macbeth density of the Mylar tape attached directly onto paper, and the evaluation was performed according to the following determination criteria.

Fogging (%)=reflectivity (%) of tape directly attached onto paper−reflectivity (%) of tape taped on drum Determination Criteria for Fogging Evaluation The fogging was excellent when the fogging (%) was less than 2.0%.

The fogging was problematic when the fogging (%) was 2.0% or greater.

Examples 2 to 25 and Comparative Examples 1 to 7

Examples 2 to 25 and Comparative Examples 1 to 7 were performed in the same manner as in Example 1 except that the peripheral speed ratio R and the toner in the evaluation of the Example 1 were changed as listed in Table 5. The evaluation conditions and the evaluation results are listed in Table 5.

TABLE 5

| | Peripheral speed ratio Rs | Toner | Density in upper portion | Density in lower portion | Difference in density | Fogging |
|---|---|---|---|---|---|---|
| Example 1 | 1.2 | Toner 1 | 1.43 | 1.41 | 0.02 | 0.3 |
| Example 2 | 1.2 | Toner 2 | 1.42 | 1.41 | 0.01 | 1.8 |
| Example 3 | 1.2 | Toner 3 | 1.44 | 1.39 | 0.05 | 0.7 |
| Example 4 | 1.2 | Toner 4 | 1.43 | 1.40 | 0.03 | 0.3 |
| Example 5 | 1.2 | Toner 5 | 1.42 | 1.36 | 0.06 | 0.6 |
| Example 6 | 1.2 | Toner 6 | 1.44 | 1.43 | 0.01 | 1.7 |
| Example 7 | 1.2 | Toner 7 | 1.40 | 1.37 | 0.03 | 0.3 |
| Example 8 | 1.2 | Toner 8 | 1.46 | 1.41 | 0.05 | 0.1 |
| Example 9 | 1.2 | Toner 9 | 1.48 | 1.38 | 0.10 | 0.2 |
| Example 10 | 1.2 | Toner 10 | 1.44 | 1.40 | 0.04 | 1.4 |
| Example 11 | 1.2 | Toner 11 | 1.37 | 1.32 | 0.05 | 1.7 |
| Example 12 | 1.2 | Toner 12 | 1.36 | 1.28 | 0.08 | 1.0 |
| Example 13 | 1.2 | Toner 13 | 1.31 | 1.21 | 0.10 | 1.3 |
| Example 14 | 1.2 | Toner 14 | 1.41 | 1.38 | 0.03 | 1.4 |
| Example 15 | 1.2 | Toner 15 | 1.42 | 1.37 | 0.05 | 1.7 |
| Example 16 | 1.2 | Toner 16 | 1.41 | 1.33 | 0.08 | 0.4 |
| Example 17 | 1.2 | Toner 17 | 1.42 | 1.28 | 0.14 | 0.3 |
| Example 18 | 1.2 | Toner 18 | 1.43 | 1.27 | 0.16 | 0.3 |
| Example 19 | 1.2 | Toner 19 | 1.43 | 1.37 | 0.06 | 1.8 |
| Example 20 | 1.2 | Toner 20 | 1.42 | 1.34 | 0.08 | 0.7 |
| Example 21 | 1.2 | Toner 21 | 1.43 | 1.27 | 0.16 | 0.4 |
| Example 22 | 1.2 | Toner 22 | 1.42 | 1.25 | 0.17 | 0.3 |
| Example 23 | 1.1 | Toner 21 | 1.42 | 1.35 | 0.07 | 1.7 |
| Example 24 | 1.8 | Toner 21 | 1.41 | 1.36 | 0.05 | 0.3 |
| Example 25 | 2.4 | Toner 21 | 1.34 | 1.31 | 0.03 | 0.2 |
| Comparative Example 1 | 1.2 | Comparative toner 1 | 1.41 | 1.37 | 0.04 | 2.6 |
| Comparative Example 2 | 1.2 | Comparative toner 2 | 1.33 | 1.29 | 0.04 | 2.7 |
| Comparative Example 3 | 1.2 | Comparative toner 3 | 1.40 | 1.14 | 0.26 | 0.4 |
| Comparative Example 4 | 1.2 | Comparative toner 4 | 1.50 | 1.19 | 0.31 | 0.0 |
| Comparative Example 5 | 1.2 | Comparative toner 5 | 1.41 | 1.38 | 0.03 | 3.1 |
| Comparative Example 6 | 0.9 | Toner 20 | 1.42 | 1.16 | 0.26 | 0.4 |
| Comparative Example 7 | 2.6 | Toner 20 | 1.29 | 1.26 | 0.03 | 1.5 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-147438, filed Sep. 12, 2023 and No. 2024-139814 filed Aug. 21, 2024, which are hereby incorporated by reference herein in their entirety.

What is claimed is:

1. A process cartridge that is mountable on an image forming apparatus, the process cartridge comprising:

a developing chamber, wherein the developing chamber includes a toner, a developing roller that develops an electrostatic latent image formed on a surface of a photosensitive drum using the toner to form a toner image, a toner supplying roller that supplies the toner to the developing roller, and a toner regulating member that regulates a layer thickness of the toner on the developing roller, wherein a surface of the developing roller is in contact with a surface of the toner supplying roller, a movement direction of the surface of the developing roller is opposite to a movement direction of the surface of the toner supplying roller in a position where the surface of the developing roller is in contact with the surface of the toner supplying roller, the movement direction of the surface of the toner supplying roller includes an upward component at the position where the surface of the developing roller is in contact with the surface of the toner supplying roller in a mounting state where the process cartridge is mounted on an apparatus main body of the image forming apparatus, the developing roller and the toner supplying roller are configured such that a peripheral speed ratio R represented by Equation (E1) satisfies $$1.1 \leq R \leq 2.5, \quad \text{(E1)}$$

$$R = V_{RS}/V_D$$

(in Equation (E1), $V_{RS}$ represents an absolute value [m/sec] of a peripheral speed of the surface of the toner supplying roller, and $V_D$ represents an absolute value [m/sec] of a peripheral speed of the surface of the developing roller), the toner contains a toner particle and a silica fine particle, the toner particle contains a crystalline resin component, a content of the silica fine particle is 1.5 parts by mass or greater and 5.0 parts by mass or less with respect to 100 parts by mass of the toner particle, the toner has an aggregation degree of 70.0% or greater and 99.0% or less, and in a case where an average area ratio of a domain of the crystalline resin component in a surface layer region to a depth of 200 nm from a surface of the toner particle is defined as As when a cross section of the toner particle is observed using a transmission electron microscope, As is 1.0% by area or less.

2. The process cartridge according to claim 1, wherein an angle between a horizontal line H and a straight line A connecting centers of rotation axes of the toner supplying roller and the developing roller in a cross section of the process cartridge on a surface perpendicular to a rotation axial line of the toner supplying roller in the mounting state where the process cartridge is mounted on the apparatus main body of the image forming apparatus is in a range of 9.5° to 10.3°.

3. The process cartridge according to claim 1, wherein in a case where an average area ratio of a toner particle surface portion that is not covered with the silica fine particle in the toner is defined as an exposure ratio Bs, the exposure ratio Bs is 55.0% by area or greater and 80.0% by area or less.

4. The process cartridge according to claim 1, wherein the toner particle contains amorphous polyester, and the amorphous polyester has a weight-average molecular weight of 25000 or greater and 75000 or less.

5. The process cartridge according to claim 4, wherein the amorphous polyester has an acid value of 10.0 mgKOH/g or greater and 30.0 mgKOH/g or less.

6. The process cartridge according to claim 1, wherein the toner particle contains boron, and a content of the boron is 0.1 ppm by mass or greater and 100.0 ppm by mass or less.

7. The process cartridge according to claim 1, wherein the process cartridge includes a toner accommodating unit for accommodating the toner, the developing chamber has a communication port that communicates with the toner accommodating unit, the toner accommodating unit is disposed below the developing chamber in a vertical direction, and the process cartridge includes a toner conveying member that conveys the toner accommodated in the toner accommodating unit onto the toner supplying roller through the communication port provided in the developing chamber.

8. The process cartridge according to claim 7, wherein the toner conveying member is a member that has elasticity and rotates to convey the toner, the toner conveying member is configured such that a free end of the toner conveying member is in contact with a wall surface of the toner accommodating unit in a region K upstream of the communication port in a rotation direction of the toner conveying member, the toner conveying member is deformed against the elasticity as the toner conveying member rotates such that the free end side rather than a rotation axis side is upstream in the rotation direction of the toner conveying member, and the free end of the toner conveying member is released from the contact with the wall surface of the toner accommodating unit in a position B which is downstream of the region K in the rotation direction of the toner conveying member and is upstream of the communication port in the rotation direction of the toner conveying member, the toner conveying member deformed is elastically restored to cause the conveyed toner to fly to the communication port, the position B is provided below a lower end of the communication port, a rotation center of the toner conveying member and a rotation center of the developing roller are positioned on the same side with respect to a vertical line passing the position B as viewed in an axial line direction of the developing roller, and a maximum value of a radius of rotation of the toner conveying member is greater than a distance between the rotation center of the conveying member and the lower end of the communication port.

9. The process cartridge according to claim 1, further comprising:

a driving force receiving unit provided at an axial end portion of the toner supplying roller;

a first driving force transmitting unit for transmitting a driving force received by the driving force receiving unit to the toner supplying roller;

a second driving force transmitting unit provided in the toner supplying roller and used to transmit the driving force received by the first driving force transmitting unit to the developing roller; and a third driving force transmitting unit provided in the developing roller and used to transmit the driving force received by the second driving force transmitting unit to the developing roller.

10. The process cartridge according to claim 9, wherein in a case where a radius of the developing roller is defined as rD [mm] and a radius of the toner supplying roller is defined as rRS [mm], the second driving force transmitting unit and the third driving force transmitting unit are connected to be driven such that a rotational angle speed ratio λ represented by Equation (E2) satisfies $$1.1 \leq \lambda \times rRS/rD \leq 2.5, \quad \text{(E2)}$$

$$\lambda = \omega RS/\omega D$$

(in Equation (E2), ORS represents a rotational angle speed [rad/sec] of the toner supplying roller, and @D represents a rotational angle speed [rad/sec] of the developing roller).

11. The process cartridge according to claim 1, wherein the peripheral speed ratio R satisfies 1.2≤R≤1.5.

* * * * *